(12) United States Patent
Beausoleil et al.

(10) Patent No.: US 7,606,272 B2
(45) Date of Patent: Oct. 20, 2009

(54) METHODS AND SYSTEMS FOR AVOIDING TRANSMISSION-CHANNEL DISRUPTIONS

(75) Inventors: Raymond G. Beausoleil, Redmond, WA (US); William J. Munro, Bristol (GB); Timothy P. Spiller, Bristol (GB); Keith A. Harrison, Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

(21) Appl. No.: 11/343,434

(22) Filed: Jan. 31, 2006

(65) Prior Publication Data
US 2007/0177634 A1 Aug. 2, 2007

(51) Int. Cl.
*H04J 3/04* (2006.01)
(52) U.S. Cl. ..................................... 370/535
(58) Field of Classification Search ................. 370/535, 370/249, 252, 485, 537, 347, 470
See application file for complete search history.

(56) References Cited

U.S. PATENT DOCUMENTS

2001/0055320 A1* 12/2001 Pierzga et al. ............... 370/480
2002/0015423 A1* 2/2002 Rakib et al. ................. 370/485
2006/0115269 A1* 6/2006 Shin et al. ..................... 398/71
2007/0070353 A1* 3/2007 Ralph et al. .................. 356/450

FOREIGN PATENT DOCUMENTS

WO WO02/30030 4/2002

OTHER PUBLICATIONS

C H Bennett et al —"Eavesdrop-Detecting Quantum Communications Channel"—IBM Technical Disclosure Bulletin—vol. 26 No. 8—Jan. 1984—pp. 4363-4366.

* cited by examiner

*Primary Examiner*—Melody Mehrpour

(57) ABSTRACT

Various embodiments of the present invention are directed to methods and systems for circumventing, and altering transmission-channel users of, transmission-channel disruptions. In one embodiment of the present invention, a source encodes information in a first signal and transmits the first signal in a source channel to a multiplexer. The multiplexer distributes the first signal over N transmission channels. A demultiplexer combines the signals distributed over the N transmission channels into a second signal encoding of the information. The distribution system also includes a detector that receives the second signal output from the demultiplexer, and one or more detectors that receive one or more additional signals output from the demultiplexer. The additional signals are produced by the demultiplexer when a disruption occurs in one or more of the transmission channels and are used to alert transmission-channel users of the disruption.

17 Claims, 25 Drawing Sheets

METHODS AND SYSTEMS FOR AVOIDING TRANSMISSION-CHANNEL DISRUPTIONS

TECHNICAL FIELD

The present invention relates to quantum computation and quantum information, and, in particular, to methods and systems for circumventing transmission-channel disruptions that are used for transmitting information encoded in either classical or quantum-based signals.

BACKGROUND OF THE INVENTION

Governments, businesses, financial institutions, and other goods and services providers provide high speed information transmitting services that enable users to rapidly access information, exchange information, and conduct business. The information transmission services include Web applications, electronic mail, electronic file transfers, and other electronic services that enable users to electronically transmit information. For example, electronic services can be used to conduct electronic funds transfers ("EFTs"), electronic data interchanges ("EDIs"), electronic benefits transfers ("EBTs"), and electronic trade confirmations ("ETCs"). An EFT service allows a payer to electronically debit the payer's account with a first bank and forward credit information to electronically credit a payee's account with a second bank. An EDI service allows transmission-channel users to electronically exchange documents, such as purchase orders, invoices, bills of lading, corporate EFTs, and other documents. An EFT service involves the transfer of public entitlement payments, such as welfare or food stamps, to merchants' accounts so that beneficiaries can purchase goods and services. An ETC service allows for acknowledgement of details regarding securities transactions, such as stock and bond transactions, to be electronically transferred between a buyer and a seller of securities.

Information is typically transmitted between goods and services providers in single transmission channels, such as in channels implemented in wires or optical fibers. FIG. 1 illustrates various transmission channels employed in a transaction between a customer and a merchant. In FIG. 1, directional arrows, such as directional arrow 101, represent single transmission channels that are used to electronically transmit information. A customer 102 can pay for goods or services offered by a merchant 103 by providing debit-card information and other customer information using a merchant Web application. Alternatively, the customer 102 can transmit debit-card information by swiping the customer's debit card through the merchant's 103 terminal. The information is then transmitted to a bank processor 104 that checks the information to determine whether or not the transaction is authentic. When the transaction is determined to be authentic, the bank processor 104 contacts the customer's bank 105 to determine whether or not sufficient funds are available in the customer's bank account. When the information is incorrect or there are insufficient funds available, the bank processor 104 notifies the merchant 103 and the transaction is terminated. When the information appears to be correct and there are sufficient funds available, the bank processor 104 directs the customer's bank 105 to transfer funds to the merchant's bank 106 and notifies the merchant 103 that the transaction has been completed successfully. The merchant 103 then notifies the customer 102 that the transaction has been completed successfully. The debit-card transaction can be typically completed in less than one minute.

Millions of electronic transactions are conducted each day using the same or similar methods as the debit card transaction and depend on reliable transmission channels to exchange information. However, rapid development of methods and systems for transmitting information over transmission channels has created an environment for criminals to target goods and services providers and transmission-channel users. Individual criminals, criminal organizations, terrorists, and adversarial governments have developed innovative methods and systems to maliciously disrupt financial markets, steal funds from financial services providers and individuals, and maliciously deny transmission-channel users access to the transmission channels. As a result of the rise in criminal activities targeting transmission-channel users, an electronic security ("e-security") industry has emerged. E-security companies have developed computer programs to actively monitor computer-system content and to examine computer systems for potentially destructive routines and computer programs, such as viruses, worms, and Trojan horses. Network-intrusion-detection applications and systems have been developed to monitor network traffic and to alert a system administrator when a malicious user is attempting to gain unauthorized access to a computer system. Cryptographic methods and systems have been developed to protect confidential communications by encrypting data using complex algorithms prior to transmission of the data from a service location to a remote destination and by decrypting received, encrypted information at the remote destination.

In addition to malicious computer-program-based attacks, malicious transmission-channel disruptions pose another kind of potential threat to the security of information-channel users. A malicious transmission-channel disruption is intended to maliciously prevent, intercept, or eavesdrop on information transmissions. For example, in FIG. 1, a criminal may cut or tap into the transmission channel 107 by a physical means, such as by cutting a number of optical fibers or wires, to prevent the customer's bank 105 and the merchant's bank 106 from exchanging funds, leading to delaying or denying transactions between tens, hundreds, thousands, and even millions of customers and merchants. Although methods and systems have been developed to prevent many kinds of malicious computer-program-based attacks on transmission-channel users, designers, manufacturers, and users of transmission channels have been slow to develop methods and systems that, in general, circumvent transmission-channel disruptions. As a result, designers, manufacturers, and users of transmission channels have recognized a need for new methods and systems that can be used to circumvent transmission-channel disruptions.

SUMMARY OF THE INVENTION

Various embodiments of the present invention are directed to methods and systems for circumventing, and altering transmission-channel users of, transmission-channel disruptions. In one embodiment of the present invention, a source encodes information in a first signal and transmits the first signal in a source channel to a multiplexer. The multiplexer distributes the first signal over N transmission channels. A demultiplexer combines the signals distributed over the N transmission channels into a second signal encoding of the information. The distribution system also includes a detector that receives the second signal output from the demultiplexer, and one or more detectors that receive one or more additional signals output from the demultiplexer. The additional signals are produced by the demultiplexer when a disruption occurs in one or more of the transmission channels and are used to alert transmission-channel users of the disruption.

DETAILED DESCRIPTION OF THE INVENTION

Figure 1:
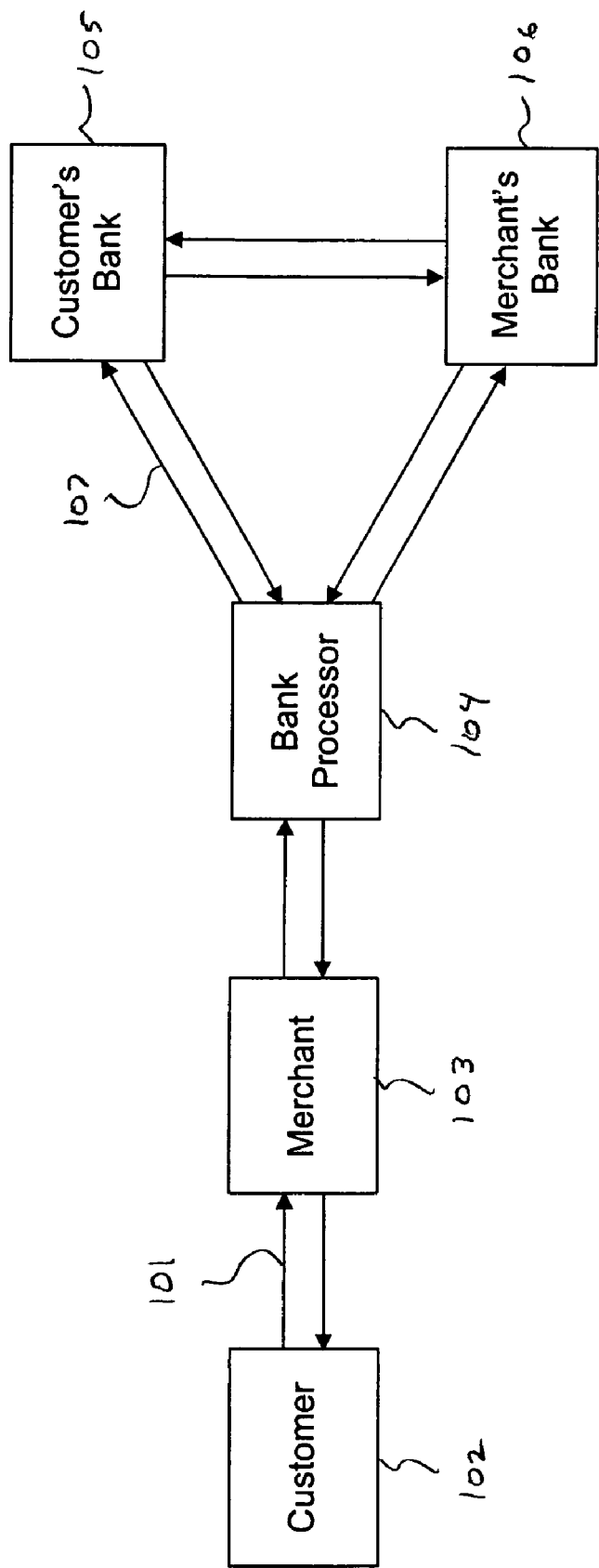
FIG. 1 illustrates various transmission channels employed in a transaction between a customer and a merchant.

Various embodiments of the present invention are directed to methods and systems for circumventing disruption of services attacks on transmission channels that can be used to transmit both classical and quantum-based representations of information. In order to assist in understanding descriptions of various embodiments of the present invention, an overview of quantum mechanics is provided below, in a first subsection. In a second subsection, an overview of electromagnetic radiation and quantum optics is provided. In a third subsection, an overview of beamsplitters, couplers, and the Mach-Zehnder interferometer is provided. In a fourth subsection, an overview of electromagnetic and quantum-based representations of data is provided. The first through fourth subsections provide background information that may be skipped by those already familiar with these topics. Finally, in a fifth subsection, various system and method embodiments of the present invention are described.

Overview of Quantum Mechanics

Embodiments of the present invention employ concepts in quantum mechanics. The textbook "Modern Quantum Mechanics Revised Edition," J. J. Sakurai, Addison Wesley Publishing Company, New York, 1994, is one reference for the field of quantum mechanics. In this subsection, topics in quantum mechanics that relate to embodiments of the present invention are described. Additional details can be obtained from the above-referenced textbook, or from many other textbooks, papers, and journal articles related to quantum mechanics.

Quantum mechanics models the observed behavior of systems at the atomic and subatomic levels, which comprise photons, electrons, atoms, and molecules. Quantum systems exist in discrete states that are characterized by discrete measurable quantities. A state of a quantum system is represented by a ket and is denoted $|\Psi\rangle$, where $\Psi$ is a label that represents a state of a quantum system. For example, an electron has two intrinsic spin-angular-momentum states that correspond to two measurable spin-angular-momentum values $\hbar/2$ and $-\hbar/2$, where $\hbar$ is approximately $1.0546 \times 10^{-34}$ Js. The spin state that corresponds to the spin-angular momentum $\hbar/2$ is referred to as "spin up" and is denoted $|\uparrow\rangle$, and the spin state that corresponds to the spin angular momentum $-\hbar/2$ is referred to as "spin down" and is denoted $|\downarrow\rangle$. Various different labels can be assigned to various different quantum states. For example, the spin up and spin down states $|\uparrow\rangle$ and $|\downarrow\rangle$ can also be represented by the kets $|\frac{1}{2}\rangle$ and $|-\frac{1}{2}\rangle$, respectively. Also, a single label can be used to represent different states in entirely different quantum systems. For example, the ket "$|1\rangle$" can represent a first quantized vibrational level of a diatomic molecule and can be used to represent a single photon, as described below, in a following subsection.

A measurement employed to determine a measurable quantity of a quantum system, such as the spin angular momentum of an electron, is represented by an operator $\hat{\Psi}$, where the symbol "^" denotes an operator. In general, an operator operates on a ket from the left as follows:

$$\hat{\Psi}(|\Psi\rangle) = \hat{\Psi}|\Psi\rangle$$

where $\hat{\Psi}|\Psi\rangle$ is a ket representing an observed quantum state. Typically, an operator $\hat{\Psi}$ is associated with a set of states called "eigenstates." An eigenstate is represented as "$|\psi_i\rangle$" with the following property:

$$\hat{\Psi}|\psi_i\rangle = \psi_i|\psi_i\rangle$$

where i is a non-negative integer, and $\psi_i$ is a real value, called an "eigenvalue," that corresponds to a discrete measurable quantity that is observed when the quantum system is in the eigenstate $|\psi_i\rangle$.

For example, a measurement employed to determine the spin angular momentum of an electron is represented by $\hat{S}_z$, and the eigenvalue-eigenstate representations of observed spin-angular-momentum values are:

$$\hat{S}_z|\uparrow\rangle = \frac{\hbar}{2}|\uparrow\rangle, \text{ and } \hat{S}_z|\downarrow\rangle = -\frac{\hbar}{2}|\downarrow\rangle$$

The eigenstates are basis vectors of a complex vector space called a "Hilbert space," and the number of eigenstates is the dimension of the Hilbert space. For example, a Hilbert space of an electron is two-dimensional, with eigenstates $|\uparrow\rangle$ and $|\downarrow\rangle$. A Hilbert space with N eigenstates $\{|\psi_i\rangle\}$ is N-dimensional, and any state $|\Psi\rangle$ in the Hilbert space can be written as a linear superposition of the eigenstates as follows:

$$|\Psi\rangle = \sum_{i=1}^{N} c_i |\psi_i\rangle$$

where $c_i$ is a complex valued coefficient called the "amplitude." A Hilbert space also includes a mathematical operation called the "inner product." The inner product of two states $|\Psi\rangle$ and $|\Xi\rangle$ is represented by:

$$\langle \Xi | \Psi \rangle$$

where $\langle \Xi |$ is called a "bra," and represents the complex conjugate and transpose of the state $|\Xi\rangle$. The inner product has the following property:

$$\langle \Xi | \Psi \rangle = \langle \Psi | \Xi \rangle^*$$

where "*" represents the complex conjugate. The basis eigenstates of a Hilbert space are orthonormal, or in mathematical notation:

$$\langle \psi_i | \psi_j \rangle = \delta_{ij},$$

where $\delta_{ij}$ is "1" when i equals j, and 0 otherwise. For example, the inner product of the eigenstates of a single electron Hilbert space are:

$$\langle \uparrow | \uparrow \rangle = \langle \downarrow | \downarrow \rangle = 1, \text{ and}$$

$$\langle \uparrow | \downarrow \rangle = \langle \downarrow | \uparrow \rangle = 0$$

The orthonomality property of the eigenstates of a Hilbert space can be used to determine the coefficients of the linear superposition of states $|\Psi\rangle$. Taking the inner product of $|\Psi\rangle$ with $\langle \psi_j |$ gives the corresponding coefficient:

$$\langle \psi_j | \Psi \rangle = \sum_{i=1}^{N} c_i \langle \psi_j | \psi_i \rangle = \sum_{i=1}^{N} c_i \delta_{ij} = c_j$$

Substituting for the coefficients in the linear superposition gives:

$$|\Psi\rangle = \sum_{i=1}^{N} |\psi_i\rangle\langle \psi_i | \Psi \rangle$$

Because $|\Psi\rangle$ is an arbitrary ket in the Hilbert space, $$\sum_{i=1}^{N} |\psi_i\rangle\langle \psi_i| = \hat{1}$$

where "$\hat{1}$" is the identity operator. The summation is called the "completeness relation," and the eigenstates $\{|\psi_i\rangle\}$ are said to be "complete."

Because eigenstates of a Hilbert space are orthonormal and provide a basis for the Hilbert space, the eigenstates can be represented by orthogonal normalized column vectors and an operator can be represented by square matrix. For example, the eigenstates of a single electron Hilbert space are represented by the column vectors:

$$|\uparrow\rangle \doteq \begin{bmatrix} 1 \\ 0 \end{bmatrix}, \text{ and } |\downarrow\rangle \doteq \begin{bmatrix} 0 \\ 1 \end{bmatrix}$$

where the symbol "$\doteq$" stands for the term "is represented by." The complex conjugates and transposes of the eigenstates are represented by the row vectors:

$$\langle \uparrow | \doteq [1 \; 0], \text{ and } \langle \downarrow | \doteq [0 \; 1]$$

Using the completeness relation, an operator $\hat{O}$ on the basis $\{|\psi_i\rangle\}$ can also be represented by:

$$\hat{O} = \sum_{i=1}^{N} \sum_{j=1}^{N} |\psi_i\rangle\langle\psi_i|\hat{O}|\psi_j\rangle\langle\psi_j|$$

where $\langle\psi_i|\hat{O}|\psi_j\rangle$ is a matrix element. The matrix corresponding to the operator $\hat{O}$ on the basis $\{|\psi_i\rangle\}$ can be represented as follows:

$$\hat{O} \doteq \begin{bmatrix} \langle\psi_1|\hat{O}|\psi_1\rangle & \langle\psi_1|\hat{O}|\psi_2\rangle & \cdots & \langle\psi_1|\hat{O}|\psi_N\rangle \\ \langle\psi_2|\hat{O}|\psi_1\rangle & \langle\psi_2|\hat{O}|\psi_2\rangle & & \vdots \\ \vdots & & \ddots & \\ \langle\psi_N|\hat{O}|\psi_1\rangle & \cdots & & \langle\psi_N|\hat{O}|\psi_N\rangle \end{bmatrix}$$

For the operator $\hat{O}$ equal to the operator $\hat{\Psi}$, the matrix representation has zero off diagonal elements, and the diagonal elements are the eigenvalues $\{\psi_i\}$. For example, the electron spin operator can be given by:

$$\hat{S}_z = \frac{\hbar}{2}\hat{\sigma}_z \quad \text{where} \quad \hat{\sigma}_z = |\uparrow\rangle\langle\uparrow| - |\downarrow\rangle\langle\downarrow|$$

The matrix representation of the electron spin operator $\hat{S}_z$ is given by:

$$\hat{S}_z \doteq \begin{bmatrix} \langle\uparrow|\hat{S}_z|\uparrow\rangle & \langle\uparrow|\hat{S}_z|\downarrow\rangle \\ \langle\downarrow|\hat{S}_z|\uparrow\rangle & \langle\downarrow|\hat{S}_z|\downarrow\rangle \end{bmatrix}$$
$$= \frac{\hbar}{2}\begin{bmatrix} 1 & 0 \\ 0 & -1 \end{bmatrix}$$

An operator $\hat{O}$ that corresponds to a measurable quantity has matrix elements satisfying the condition:

$$\langle\psi_i|\hat{O}|\psi_j\rangle = \langle\psi_j|\hat{O}|\psi_i\rangle^*$$

and is said to be a "Hermitian operator."

Prior to a measurement, a quantum system can simultaneously exist in all of the eigenstates of a corresponding Hilbert space, which is represented by the (pure state) linear superposition of states:

$$|\Psi\rangle = \sum_{i=1}^{N} c_i|\psi_i\rangle = \sum_{i=1}^{N}|\psi_i\rangle\langle\psi_i|\Psi\rangle$$

A measurement performed on the quantum system $|\Psi\rangle$ projects the quantum system into one of the eigenstates. In other words, a measurement on a quantum system is essentially a filtering process that places the quantum system into one of the eigenstates in the linear superposition at the time of the measurement. For example, an electron with an unknown spin orientation prior to a measurement exists in a linear superposition of states:

$$|\Psi\rangle = c_1|\uparrow\rangle + c_2|\downarrow\rangle$$

A spin determination measurement $\hat{S}_z$ projects the linear superposition of states into either the state $|\uparrow\rangle$ or the state $|\downarrow\rangle$ at the time of the measurement.

There is a corresponding irreversible change to the state of a quantum system as a result of a measurement. Irreversibility can only be avoided when the quantum system is already in one of the quantum states before the measurement is performed. As a result, one cannot infer the prior state of a quantum system based on the outcome of a single measurement. For example, if the outcome of a spin measurement is $\hbar/2$, it is not possible to determine whether the system was already in the state $|\uparrow\rangle$ or in a linear superposition of the spin states $|\uparrow\rangle$ and $|\downarrow\rangle$ at the time of the measurement.

Although it is not possible to know in advance which of the various states $|\psi_i\rangle$ a quantum system will be projected into, the probability of measuring a particular state $|\psi_i\rangle$ is given by:

Probability for $\psi_i = |c_i|^2 = |\langle\psi_i|\Psi\rangle|^2$ where $|\Psi\rangle$ is normalized, and $|c_i|^2$ equals $c^*_i c_i$ and gives the outcome probability. For example, prior to a spin determination measurement in the spin basis $|\uparrow\rangle$ and $|\downarrow\rangle$, consider an electron with a ½ probability of being in the spin state $|\uparrow\rangle$ or the spin state $|\downarrow\rangle$. The linear superposition of the electron in such as spine state prior to a spin determination measurement can be represented by:

$$|\Psi\rangle = \frac{1}{\sqrt{2}}|\uparrow\rangle + \frac{1}{\sqrt{2}}|\downarrow\rangle$$

The expectation value of measurement on an ensemble of quantum systems that are described by the linear superposition of states $|\Psi\rangle$ is mathematically represented by:

$$\langle\hat{\Psi}\rangle = \langle\Psi|\hat{\Psi}|\Psi\rangle$$

and is determined by applying the completeness relation as follows:

$$\langle\hat{\Psi}\rangle = \sum_{i=1}^{N}\sum_{j=1}^{N}\langle\Psi|\psi_i\rangle\langle\psi_i|\hat{\Psi}|\psi_j\rangle\langle\psi_j|\Psi\rangle$$
$$= \sum_{i=1}^{N}\psi_i|\langle\psi_i|\Psi\rangle|^2$$

The expectation value represents the weighted eigenvalue average result expected from measurements on the quantum systems in the ensemble, where the initial state $|\Psi\rangle$ of the quantum system is the same for each member of the ensemble. In other words, the linear superposition of states of each quantum system is identical prior to the measurement. In practice, such an ensemble could be realized by preparing many identical and independent quantum systems all in the same state, or by repeatedly preparing a single system in the same state. Note that the expectation value may not be the value obtained for each measurement and, therefore, is not to be confused with the eigenvalue of the measurement. For example, the expectation value of $\hat{S}_z$ can be any real value between the eigenvalues $\hbar/2$ and $-\hbar/2$, but the actual measured value of $\hat{S}_z$ for an electron is always either $\hbar/2$ or $-\hbar/2$ in each individual measurement.

A tensor product is a way of combining Hilbert spaces of different quantum systems to form Hilbert spaces that represent combined quantum systems. For example, $H_\Psi$ is a Hilbert space of a first quantum system, and $H_\Xi$ is a Hilbert space of a second quantum system. The Hilbert space denoted by $H_\Psi \otimes H_\Xi$ represents a combined Hilbert space, where the symbol $\otimes$ represents a tensor product. The operators $\hat{\Psi}$ and $\hat{\Xi}$ correspond to the Hilbert spaces $H_\Psi$ and $H_\Xi$, respectively, and each operates only on the corresponding eigenstates as follows:

$$(\hat{\Psi} \otimes \hat{\Xi})(|\psi\rangle \otimes |\xi\rangle) = (\hat{\Psi}|\psi\rangle) \otimes (\hat{\Xi}|\xi\rangle)$$

where $|\psi\rangle$ represents a state in the Hilbert space $H_\Psi$, and $|\xi\rangle$ represents a state in the Hilbert space $H_\Xi$. The tensor product $|\psi\rangle \otimes |\xi\rangle$ can be abbreviated as $|\psi\rangle|\xi\rangle$, $|\psi, \xi\rangle$, or $|\psi\xi\rangle$. The spin states of two electrons in an atomic orbital is an example of a combined Hilbert space. The two electrons can either both be spin up, both be spin down, the first electron spin up and the second electron spin down, or the first electron spin down and the second electron spin up. The various tensor product representations of two spin up electrons are given by:

$$|\uparrow\rangle_1 \otimes |\uparrow\rangle_2 = |\uparrow\rangle_1|\uparrow\rangle_2 = |\uparrow, \uparrow\rangle_{12} = |\uparrow\uparrow\rangle_{12}$$

where the subscripts 1 and 2 refer to the first and second electrons.

In quantum mechanics, there are also measurable quantities with continuous eigenvalue spectrums. The dimensionality of the corresponding Hilbert spaces are infinite and many of the properties described above for discrete quantum systems can be generalized for continuous quantum systems. A continuous eigenvalue equation is:

$$\hat{\zeta}|\zeta\rangle = \zeta|\zeta\rangle$$

where $\zeta$ represents a continuous eigenvalue, and the ket $|\zeta\rangle$ is a continuous eigenstate of the operator $\hat{\zeta}$. For example, for an unbound particle, both position q and momentum p are continuous eigenvalues of the position and momentum operators $\hat{q}$ and $\hat{p}$, respectively, and can assume any real value between $-\infty$ and $\infty$.

The properties of the continuous variable $\zeta$ can be generalized as follows:

$$\langle \zeta | \zeta' \rangle = \delta(\zeta - \zeta'),$$

$$\int_{-\infty}^{\infty} d\zeta |\zeta\rangle\langle\zeta| = 1, \text{ and}$$

$$\langle \zeta | \hat{\zeta} | \zeta' \rangle = \zeta' \delta(\zeta - \zeta')$$

where $$\delta(\zeta - \zeta') = \lim_{\Delta \to 0} \frac{1}{\sqrt{2\pi\Delta^2}} \exp\left(-\frac{(\zeta - \zeta')^2}{2\Delta^2}\right)$$

A state ket for an arbitrary physical state can be expanded in terms of the states $\{|\zeta\rangle\}$ as follows:

$$|\alpha\rangle = \int_{-\infty}^{\infty} d\zeta |\zeta\rangle\langle\zeta|\alpha\rangle$$

For example, consider placing in the path of a particle a detector that outputs the position of the particle when the particle is at the position q. Immediately after the measurement is taken, the system, initially in the state $|\alpha\rangle$, is projected into the state represented by $|q\rangle$ in much the same way an arbitrary electron-spin state is projected into one of the two spin states when a spin detection measurement is performed. Other properties of the continuous variable $\zeta$ are given by:

$$\int_{-\infty}^{\infty} d\zeta |\langle\zeta|\alpha\rangle|^2 = 1, \text{ and}$$

$$\langle\beta|\alpha\rangle = \int_{-\infty}^{\infty} d\zeta \langle\beta|\zeta\rangle\langle\zeta|\alpha\rangle$$

The momentum operator $\hat{p}$ can also be represented by a differential operator $-i\hbar\partial/\partial q$. As a result, both the position and momentum operators satisfy the canonical commutation relations:

$$[\hat{q}_i, \hat{q}_j] = 0$$

$$[\hat{p}_i, \hat{p}_j] = 0, \text{ and}$$

$$[\hat{q}_i, \hat{p}_j] = i\hbar\delta_{ij}$$

where i and j represent orthogonal coordinates, such as the Cartesian x, y, and z coordinates, and the commutator is defined as $[A, B] = AB - BA$.

An Overview of Electromagnetic Radiation and Quantum Optics

In this subsection, a brief description of electromagnetic radiation and quantum optics that relates to embodiments of the present invention is described. The textbooks "Quantum Optics," M. O. Scully and M. S. Zubairy, Cambridge University Press, Cambridge, United Kingdom, 1997, and "The Quantum Theory of Light ($3^{rd}$ Edition)," R. Loudon, Oxford University Press, New York, 2000 are two of many references for quantum optics. Additional details can be obtained from the above-referenced textbooks, or from many other textbooks, papers, and journal articles in this field.

Quantum optics is a field of physics that relates the application of quantum mechanics to electromagnetic radiation. Electromagnetic radiation confined to a cavity with perfectly reflecting walls is quantized. Quantized electromagnetic radiation can be applied to more general unconfined optical systems, such as electromagnetic radiation propagating in free space or in an optical fiber.

Electromagnetic radiation confined to a cavity, with no free charges and currents, comprises an electric field component $\vec{E}(\vec{r},t)$ and a magnetic field component $\vec{B}(\vec{r},t)$ that are related in terms of a vector potential $\vec{A}(\vec{r},t)$ satisfying the wave equation:

$$\nabla^2 \vec{A} - \frac{1}{c^2} \frac{\partial^2 \vec{A}}{\partial t^2} = 0$$

and the Coulomb, non-relativistic gauge condition:

$$\nabla \cdot \vec{A}(\vec{r},t) = 0$$

where the electric and magnetic field components are determined by:

$$\vec{E}(\vec{r}, t) = -\frac{\partial \vec{A}(\vec{r}, t)}{\partial t}, \text{ and}$$

$$\vec{B}(\vec{r}, t) = \nabla \times \vec{A}(\vec{r}, t)$$

Figure 2:
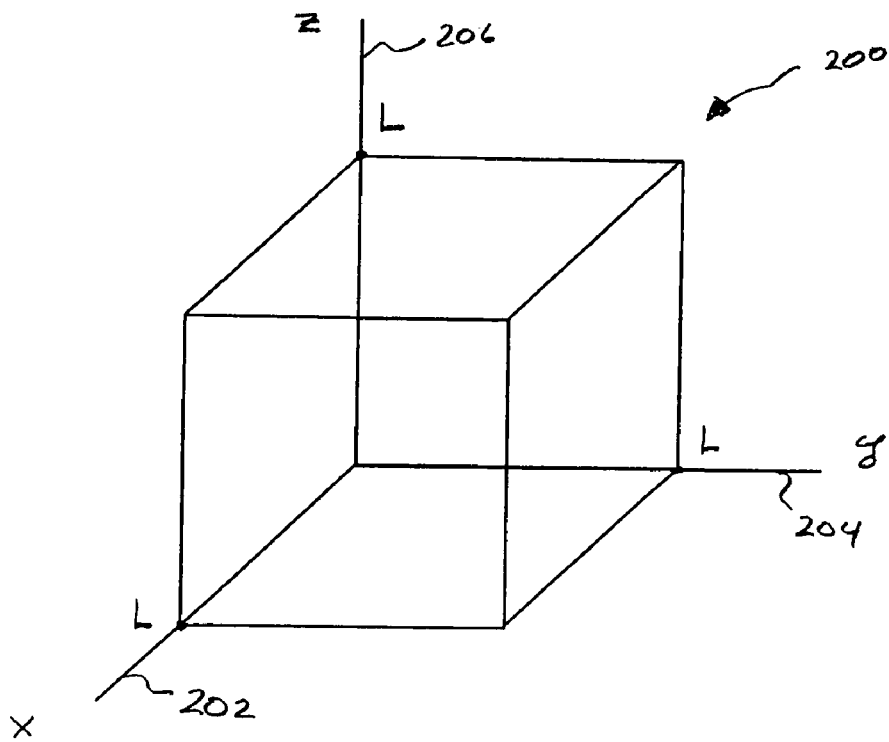
FIG. 2 illustrates a cubic cavity.

The electromagnetic radiation is assumed to be confined in a cubic cavity with perfectly reflecting walls, where the lengths of the walls L are much longer than the wavelengths of the electromagnetic radiation. FIG. 2 illustrates a cubic cavity 200. Orthogonal axes 202, 204, and 206 represent the x, y, and z Cartesian coordinate axes. The finite dimensional cubic cavity 200 imposes periodic boundary conditions on solutions to the wave equation. For example, in the x, y, and z-directions, plane wave solutions to the vector potential wave equation satisfy the condition:

$$\exp(i\vec{k}\cdot\vec{r}) = \exp(i\vec{k}\cdot(\vec{r}+\vec{L}))$$

where $\vec{L}$ is (L, L, L), and
$\vec{k}$ is called the "wavevector" with components:

$$\vec{k} = \frac{2\pi}{L}(m_x, m_y, m_z), \text{ and}$$

$m_x$, $m_y$, and $m_z$ are integers.

Each set of integers ($m_x$, $m_y$, $m_z$) specifies a normal mode of the electromagnetic radiation, and the magnitude of the wavevector $\vec{k}$, k, is equal to $\omega_k/c$, where c represents the speed of light in free space and $\omega_k$ is the angular frequency. Note that in real life the spectrum of normal modes of an electromagnetic field is actually continuous and a discrete spectrum of normal modes suggested by the wavevector $\vec{k}$ is an approximation to the continuous spectrum.

A vector potential solution to the wave equation above that satisfies the periodic boundary conditions is:

$$A(r,t) = \sum_{\vec{k},s} \vec{e}_{\vec{k}s}\left(A_{\vec{k}s}e^{i(\vec{k}\cdot\vec{r}-\omega_k t)} + A^*_{\vec{k}s}e^{-i(\vec{k}\cdot\vec{r}-\omega_k t)}\right)$$

where $A\vec{k}_s$ is a complex amplitude of the electromagnetic radiation, and $\vec{e}\vec{k}_s$ represents two unit-length polarization vectors. The sum over $\vec{k}$ represents the sum over the integers ($m_x$, $m_y$, $m_z$), and the sum over s is the sum over the two independent polarizations that are associated with each $\vec{k}$. The two polarization vectors are orthogonal as indicated by:

$$\vec{e}\vec{k}_s \cdot \vec{e}\vec{k}_{s'} = \delta_{ss'}$$

and from the gauge condition given above:

$$\vec{k} \cdot \vec{e}\vec{k}_s = 0$$

for both polarization directions s. The two polarization vectors $\vec{e}\vec{k}_1$ and $\vec{e}\vec{k}_2$ form a right-handed coordinate system with a normalized wavevector given by:

$$\vec{e}_{\vec{k}1} \times \vec{e}_{\vec{k}2} = \frac{\vec{k}}{|\vec{k}|} = \vec{\kappa}$$

Figure 3:
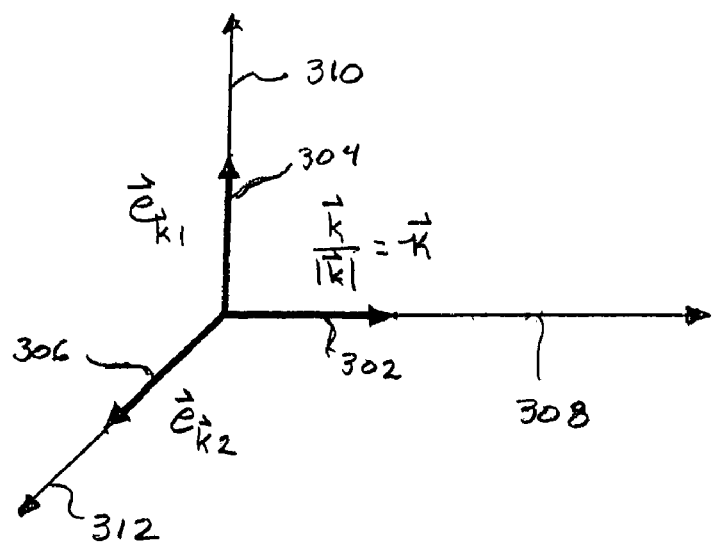
FIG. 3 illustrates a three-dimensional right-handed coordinate system with two independent polarization vectors and a normalized wavevector as basis vectors.

FIG. 3 illustrates a three-dimensional right-handed coordinate system with two independent polarization vectors $\vec{e}\vec{k}_s$ and a normalized wavevector $\vec{\kappa}$ as basis vectors. In FIG. 3, the wavevector $\vec{\kappa}$ 302, and the polarization vectors, $\vec{e}\vec{k}_1$ 304 and $\vec{e}\vec{k}_2$ 306, are three orthogonal unit length basis vectors of a coordinate system with coordinate axes represented by lines 308, 310, and 312, respectively.

The electric and magnetic field components of the vector potential are:

$$\vec{E}(\vec{r},t) = i\sum_{\vec{k},s}\omega_k \vec{e}_{\vec{k}s}\left[A_{\vec{k}s}e^{i(\vec{k}\cdot\vec{r}-\omega_k t)} - A^*_{\vec{k}s}e^{-i(\vec{k}\cdot\vec{r}-\omega_k t)}\right], \text{ and}$$

$$\vec{B}(\vec{r},t) = \frac{i}{c}\sum_{\vec{k},s}\omega_k(\vec{k}\times\vec{e}_{\vec{k}s})\left[A_{\vec{k}s}e^{i(\vec{k}\cdot\vec{r}-\omega_k t)} - A^*_{\vec{k}s}e^{-i(\vec{k}\cdot\vec{r}-\omega_k t)}\right]$$

Both the electric field $\vec{E}(\vec{r},t)$ and magnetic field $\vec{B}(\vec{r},t)$ are referred to as the "classical" representation of the electric and magnetic field, are orthogonal to one another, and are both orthogonal to the wavevector $\vec{k}$.

Figure 4:
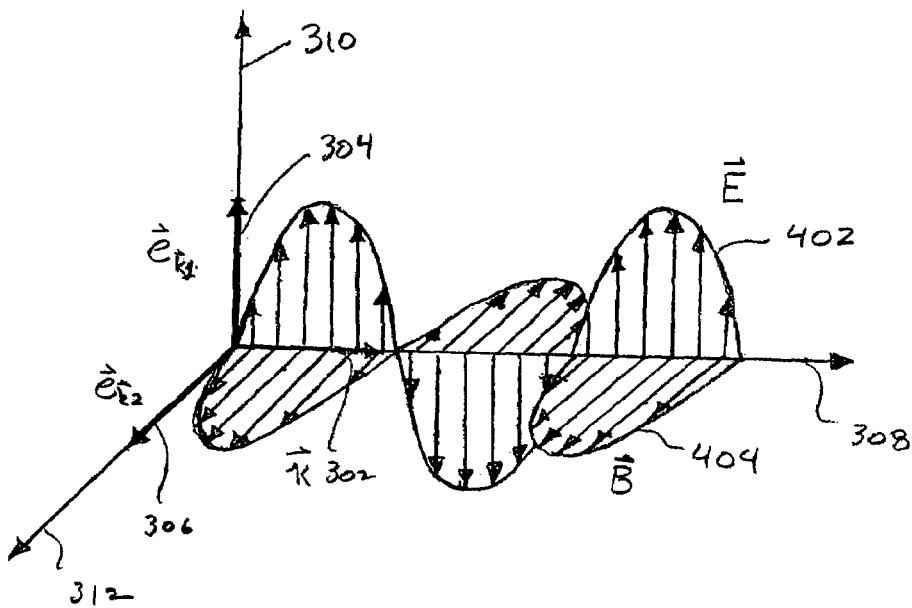
FIG. 4 illustrates a representation of electric and magnetic field components of an electromagnetic field in the right-handed coordinate system shown in FIG. 3.

FIG. 4 illustrates a representation of electric and magnetic field components of electromagnetic radiation in the right-handed coordinate system shown in FIG. 3. The electromagnetic radiation is directed along the wavevector $\vec{\kappa}$ 302 axis. The electric field component $\vec{E}(\vec{r},t)$ 402 and magnetic field component $\vec{B}(\vec{r},t)$ 404 are directed along the orthogonal polarization vectors $\vec{e}\vec{k}_1$ 304 and $\vec{e}\vec{k}_2$ 306, respectively.

The energy of the electromagnetic radiation can be determined by evaluating the Hamiltonian:

$$H = \frac{1}{2}\int_V \left(\varepsilon_0 \vec{E}\cdot\vec{E} + \frac{1}{\mu_0}\vec{B}\cdot\vec{B}\right)dV$$

$$= 2\varepsilon_0 V \sum_{\vec{k},s} \omega_k^2 A_{\vec{k}s} A^*_{\vec{k}s}$$

where $\varepsilon_0$ is the electric permittivity of free space,
$\mu_0$ is the magnetic permeability of free space, and
V is the volume of the cavity.

The electric permittivity $\varepsilon_0$ represents the degree to which a vacuum space can store electrical potential energy under the influence of an electric field, and the magnetic permeability $\mu_0$ represents the degree to which the vacuum modifies the flux of a magnetic field. In a non-conducting medium, the electric permittivity is further multiplied by $\varepsilon$, which is the degree to which the medium enhances the storage of electrical potential energy, and the magnetic permeability is further multiplied by $\mu$, which is the degree to which the medium further enhances the flux of a magnetic field.

In order to quantize the electric field $\vec{E}(\vec{r},t)$ and magnetic field $\vec{B}(\vec{r},t)$ components, the canonical variables for position, $q\vec{k}_s$, and momentum, $p\vec{k}_s$, are introduced into the Hamiltonian by setting:

$$A_{\vec{k}s} = \frac{1}{2\omega_k\sqrt{\varepsilon_0 V}}(\omega_k q_{\vec{k}s} + ip_{\vec{k}s})$$

As a result, the Hamiltonian for the electromagnetic radiation becomes:

$$H = \frac{1}{2}\sum_{\vec{k},s}\left(p_{\vec{k}s}^2 + \omega_k^2 q_{\vec{k}s}^2\right)$$

Each term in the Hamiltonian is the energy of a harmonic oscillator with vibrational mode $\vec{k}s$, where the term $p\vec{k}_s^2/2$ is the kinetic energy, and the term $\omega_k q\vec{k}_q^2/2$ is the potential energy of a harmonic oscillator with a unit mass. The Hamiltonian is quantized by replacing the position and momentum variables $q\vec{k}_s$ and $p\vec{k}_s$ with quantum mechanical position and momentum operators $\hat{q}\vec{k}_s$ and $\hat{p}\vec{k}_s$, respectively, to give the quantum Hamiltonian operator:

$$\hat{H} = \frac{1}{2}\sum_{\vec{k},s}\left(\hat{p}_{\vec{k}s}^2 + \omega_k^2 \hat{q}_{\vec{k}s}^2\right)$$

Annihilation and creation operators are defined by:

$$\hat{a}_{\vec{k}s} = \frac{1}{\sqrt{2\hbar\omega_k}}(\omega_k \hat{q}_{\vec{k}s} + i\hat{p}_{\vec{k}s}), \text{ and}$$

$$\hat{a}_{\vec{k}s}^\dagger = \frac{1}{\sqrt{2\hbar\omega_k}}(\omega_k \hat{q}_{\vec{k}s} - i\hat{p}_{\vec{k}s}),$$

and substituting the annihilation and creation operators into the quantum Hamiltonian operator gives:

$$\hat{H} = \sum_{\vec{k},s} \hbar\omega_k \left(\hat{a}_{\vec{k}s}^\dagger \hat{a}_{\vec{k}s} + \frac{1}{2}\right)$$

where $\hat{a}_{\vec{k}s}^\dagger \hat{a}_{\vec{k}s}$ is called the "number operator" and is also denoted by $\hat{n}_{\vec{k}s}$. Using the canonical commutation relations for the position and momentum operators, the annihilation and creation operators satisfy the commutation relations given by:

$$[\hat{a}_{\vec{k}s}, \hat{a}_{\vec{k}'s'}] = 0 = [\hat{a}_{\vec{k}s}^\dagger, \hat{a}_{\vec{k}'s'}^\dagger]$$

$$[\hat{a}_{\vec{k}s}, \hat{a}_{\vec{k}'s'}^\dagger] = \delta_{\vec{k}\vec{k}'}\delta_{ss'}$$

When the electromagnetic radiation is quantized, the amplitudes $A_{\vec{k}s}$ become operators:

$$\hat{A}_{\vec{k}s} = \sqrt{\frac{\hbar}{2\omega_k \varepsilon_0 V}}\, \hat{a}_{\vec{k}s}$$

which can be substituted into the classical electric and magnetic field equations above to obtain electric and magnetic field operators:

$$\hat{E}(\vec{r}, t) = i\sum_{\vec{k},s} \sqrt{\frac{\hbar\omega}{2\varepsilon_0 V}}\, e_{\vec{k}s}[\hat{a}_{\vec{k}s} e^{i(k\cdot r - \omega_k t)} - \hat{a}_{\vec{k}s}^\dagger e^{-i(k\cdot r - \omega_k t)}], \text{ and}$$

$$\hat{B}(\vec{r}, t) = \frac{i}{c}\sum_{\vec{k},s} (\vec{k}\times e_{\vec{k}s}) \sqrt{\frac{\hbar\omega}{2\varepsilon_0 V}}\, e_{\vec{k}s}[\hat{a}_{\vec{k}s} e^{i(k\cdot r - \omega_r t)} - \hat{a}_{\vec{k}s}^\dagger e^{-i(k\cdot r - \omega_k t)}]$$

Both the electric and magnetic field operators are Hermitian and represent measurable electric and magnetic fields.

Most electromagnetic radiation interactions with matter result from the electric field component rather than the magnetic field component, because the magnetic field is smaller than the electric field by the factor 1/c. As a result, the electric field alone is generally used to characterize the behavior of electromagnetic radiation and any interactions with matter, and the magnetic field component can be ignored.

Quantum computation and quantum information processing systems can be operated using a single-mode $\vec{k}s$ of electromagnetic radiation. As a result, the Hamiltonian operator for a single-mode of electromagnetic radiation reduces to:

$$\hat{H} = \hbar\omega\left(\hat{a}^\dagger \hat{a} + \frac{1}{2}\right)$$

where $\hat{a}$ and $\hat{a}^\dagger$ replace the operators $\hat{a}_{\vec{k}_j s_j}$ and $\hat{a}_{\vec{k}_j s_j}^\dagger$ in the Hamiltonian above. The eigenstates and the corresponding energy eigenvalues of the single-mode Hamiltonian are:

$$\hat{H}|n\rangle = \hbar\omega\left(\hat{a}^\dagger \hat{a} + \frac{1}{2}\right)|n\rangle = E_n|n\rangle$$

where $|n\rangle$ is called a "number state," n is a nonnegative integer called a "photon number," and $E_n$ is an energy eigenvalue.

The annihilation and creation operators operate on a number state as follows:

$\hat{a}|n\rangle = \sqrt{n}|n-1\rangle$, $\hat{a}^\dagger|n\rangle = \sqrt{n+1}|n+1\rangle$, and $\hat{n}|n\rangle = n|n\rangle$ where $\hat{n}$ represents the operator $\hat{a}^\dagger \hat{a}$ and is called the "number operator." The number states can be generated by repeated application of the annihilation and creation operators to the number states. For example, repeated application of the annihilation operator to a number state lowers the photon number:

$$|0\rangle = \frac{\hat{a}^n}{\sqrt{n!}}|n\rangle$$

where $|0\rangle$ is called the "vacuum state," which represents the lowest energy state of the electromagnetic radiation. Beginning with the vacuum state, and repeatedly applying the creation operator gives:

$$|n\rangle = \frac{(\hat{a}^\dagger)^n}{\sqrt{n!}}|0\rangle$$

The number states are orthogonal and form a compete set represented by:

$\langle m'|n\rangle = \delta_{n'n}$, and $$\sum_{n=0}^{\infty} |n\rangle\langle n| = 1$$

In general, the energy eigenvalue equation associated with a number state $|n\rangle$ is:

$$\hat{H}|n\rangle = \hbar\omega\left(n + \frac{1}{2}\right)|n\rangle = E_n|n\rangle$$

Applying the annihilation and creation operators to the energy eigenvalue equation gives:

$$\hat{H}(\hat{a}|n\rangle) = \hbar\omega\left(n - \frac{1}{2}\right)|n-1\rangle = (E_n - \hbar\omega)|n-1\rangle, \text{ and}$$

$$\hat{H}(\hat{a}^\dagger|n\rangle) = \hbar\omega\left(n + \frac{3}{2}\right)|n+1\rangle = (E_n + \hbar\omega)|n+1\rangle$$

which shows that the energy levels of electromagnetic radiation are equally spaced by a quantum of energy $\hbar\omega$. In other words, the excitations of electromagnetic radiation occur in discrete amounts of energy $\hbar\omega$ called "photons." The photon number n refers to the number of photons $\hbar\omega$ comprising the electromagnetic radiation.

Figure 5:
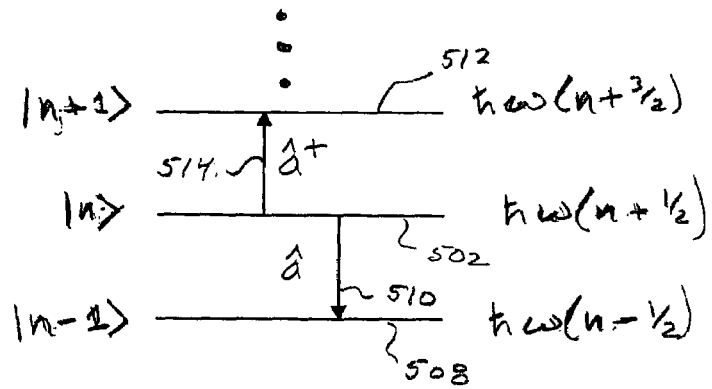
FIG. 5 is an energy level diagram of a quantized electromagnetic field.
Figure 5:
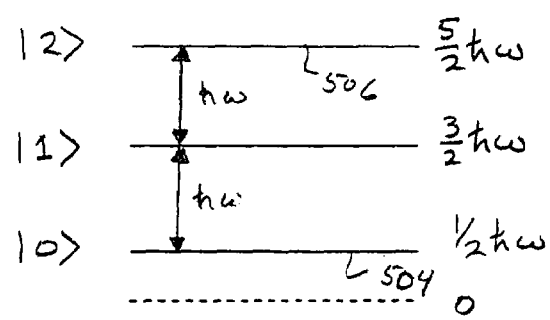

FIG. 5 is an energy level diagram of quantized electromagnetic radiation. Horizontal lines, such as horizontal line 502, represent energy levels of electromagnetic radiation. Energy level 504 is the lowest energy level, which corresponds to the vacuum state $|0\rangle$. The energy of the vacuum state is $\hbar\omega/2$ or ½ the energy of a single photon. Higher energy levels of electromagnetic radiation are each separated by the same quantum of energy $\hbar\omega$. For example, the energy level 506 represents electromagnetic radiation with a total electromagnetic energy of $5\hbar\omega/2$, which can be thought of as the energy of two photons plus the vacuum state energy $\hbar\omega/2$. The annihilation operator corresponds to removal of a photon from the electromagnetic radiation, and the creation operator corresponds to addition of a photon to the electromagnetic radiation. For example, the annihilation operator $\hat{a}$ represents an electromagnetic-radiation transition 508 from the state $|n\rangle$ 502 to the lower energy state $|n-1\rangle$ 510. The transition 508 is achieved by giving up a photon to the surroundings. By contrast, the creation operator $\hat{a}^\dagger$ represents an electromagnetic-radiation transition 512 from the state $|n\rangle$ 502 to the higher energy state $|n+1\rangle$ 514. The transition 512 is achieved by accepting a photon from the surroundings. Note that typically the surroundings can be an atom, a quantum dot, or any other system that couples to the field through a dipole interaction. Loss or absorption of a photon will involve a simultaneous excitation of the surrounding system and creation or emission of a photon will involve a corresponding de-excitation of the surrounding system.

Photons can be generated by a photon source and transmitted through free space or in an optical fiber. The photon source can be a pulsed laser that generates a single pulse or a train of pulses, each pulse containing one or more photons that all have the same optical properties, such as wavelength and direction. Photons with the same optical properties are called "coherent." However, the source, the detector, and a medium, such as an optical fiber, separating the source from the detector do not define an optical cavity. The source and the detector are parts of a continuous unidirectional flow of optical energy with no significant reflection or recycling of the optical energy. A pulse transmitted through free space or an optical fiber is described by a wavepacket that can be represented by a time-dependent, Gaussian-shaped function given by:

$$\xi(t) = \left(\frac{2\Delta^2}{\pi}\right)^{\frac{1}{4}} \exp\{-i\omega_0 t - \Delta^2 (t_0 - t)^2\}$$

where $\omega_0$ is the central frequency of the pulse spectrum, t is time, $t_0$ is the time at which the peak of the wavepacket is located at a distance $z_0$ from the photon source, and $\Delta^2$ is the variance of the intensity spectrum. The time $t_0$ can be determined by $z_0/v$, where $v$ is the velocity of the pulse traveling through free space or in an optical fiber.

The wavepacket $\xi(t)$ is the amplitude of the pulse, and $|\xi(t)|^2$ a photodetection probability density function of the pulse, where the photodetection probability density function $|\xi(t)|^2$ satisfies the normalization condition:

$$\int_{-\infty}^{\infty} dt |\xi(t)|^2 = 1$$

The probability of photodetection of a photon in the time interval $(t_1, t_2)$ at a distance $z_0$ from the photon source is given by:

$$\text{Probability of } (t_1 < t_2) = \int_{t_1}^{t_2} dt |\xi(t)|^2$$

Figure 6:
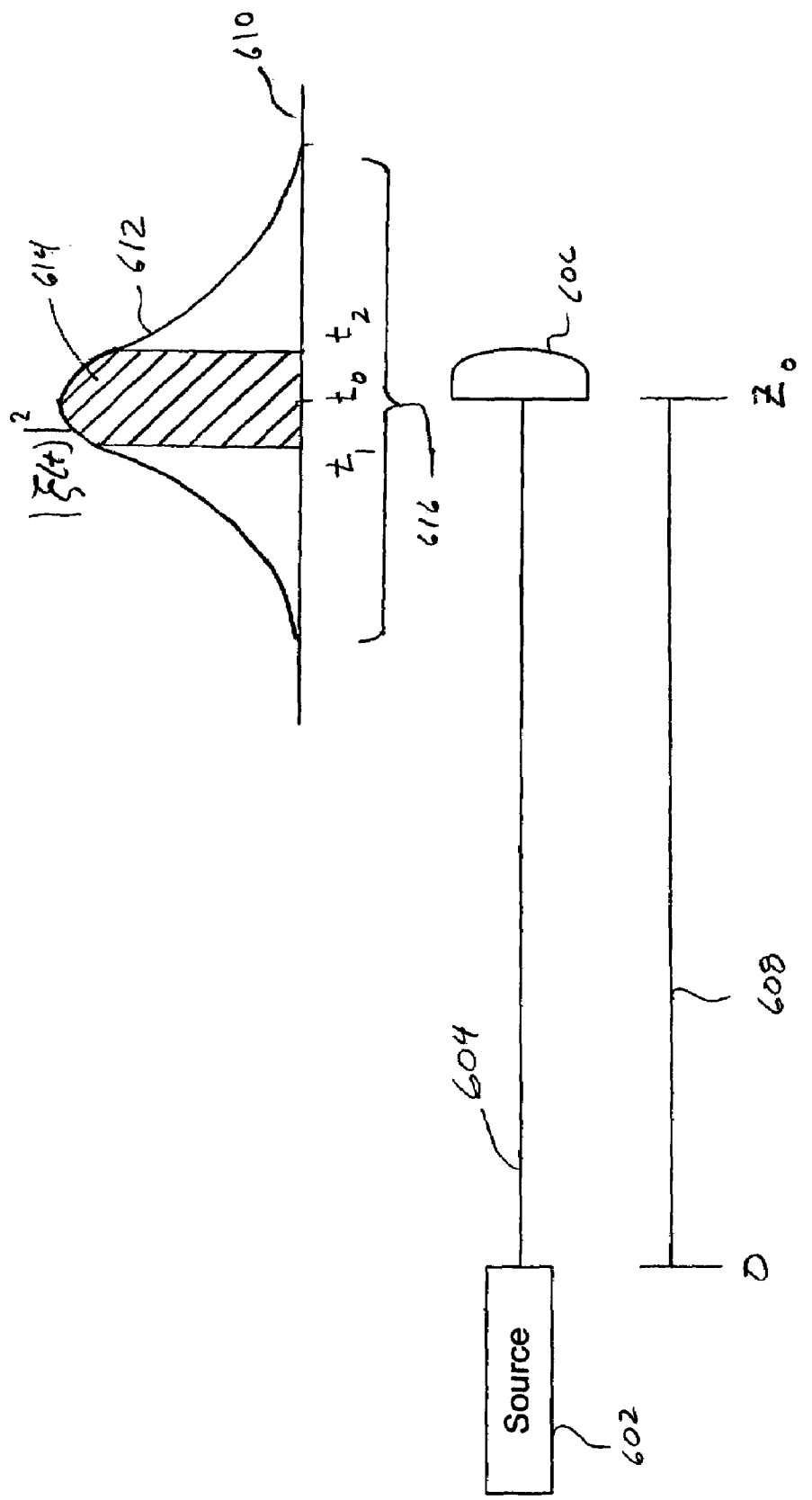
FIG. 6 illustrates a probability amplitude associated with a pulse output from a source and transmitted in an optical fiber to a detector.

FIG. 6 illustrates a probability distribution associated with a pulse output from a source 602 and transmitted in an optical fiber 604 to a detector 606. The horizontal line 608 represents the distance $z_0$ the photon travels from the source 602 to the detector 606, and the horizontal line 610 is a time axis. The curve 612 represents the photodetection probability density function $|\xi(t)|^2$. In FIG. 6, the photodetection probability density function $|\xi(t)|^2$ 612 is centered at the time $t_0$, which corresponds to the time a pulse takes to travel the distance $z_0$. An area under the curve 612 represents the probability of detecting the pulse within a particular time period. For example, hash-marked region 614 represents the probability of detecting the photon within the time period $t_1 < t_0 < t_2$. Time period 616 is called a "time bin" and corresponds to the time period within which the photon is detected at the detector 606.

The time dependent creation operators can be used to generate a photon wavepacket creation operator as follows:

$$\hat{a}_\xi^\dagger = \int_{-\infty}^{\infty} dt \xi(t) \hat{a}^\dagger(t)$$

The creation operator can be used to construct continuous-mode number states that represent photons transmitted through free space or in an optical fiber as follows:

$$|n_\xi\rangle = \frac{(\hat{a}_\xi^\dagger)^n}{\sqrt{n!}} |0\rangle$$

where $|0\rangle$ is the continuous-mode vacuum state. The continuous-mode number states satisfy the following same conditions:

$$\hat{n}|n_\xi\rangle = n|n_\xi\rangle$$

$$\langle n'_\xi | n_\xi \rangle = \delta_{n'n}, \text{ and } \sum_{n_\xi=0}^{\infty} |n_\xi\rangle\langle n_\xi| = 1$$

As a result, the subscript $\xi$ used to identify continuous-mode number states can be dropped. Note that the wavepacket constructed photon is not an eigenstate of any Hamiltonian.

An Overview of Beamsplitters, Couplers, and The Mach-Zehnder Interferometer

Figure 7A:
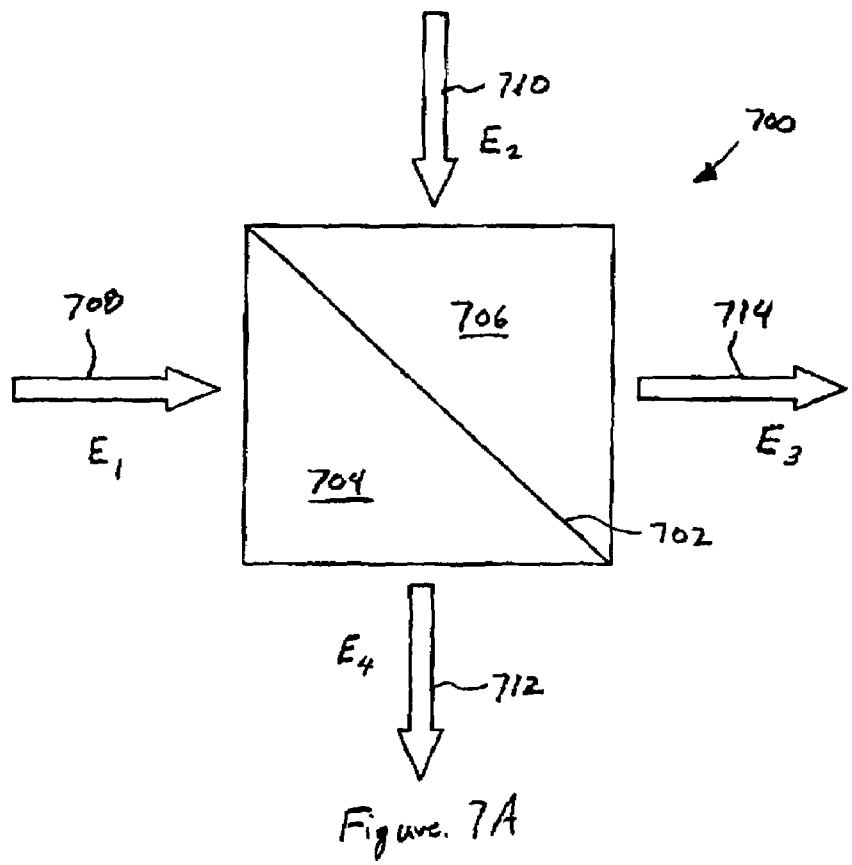
FIG. 7A illustrates a representation of an optical beamsplitter.
Figure 7B:
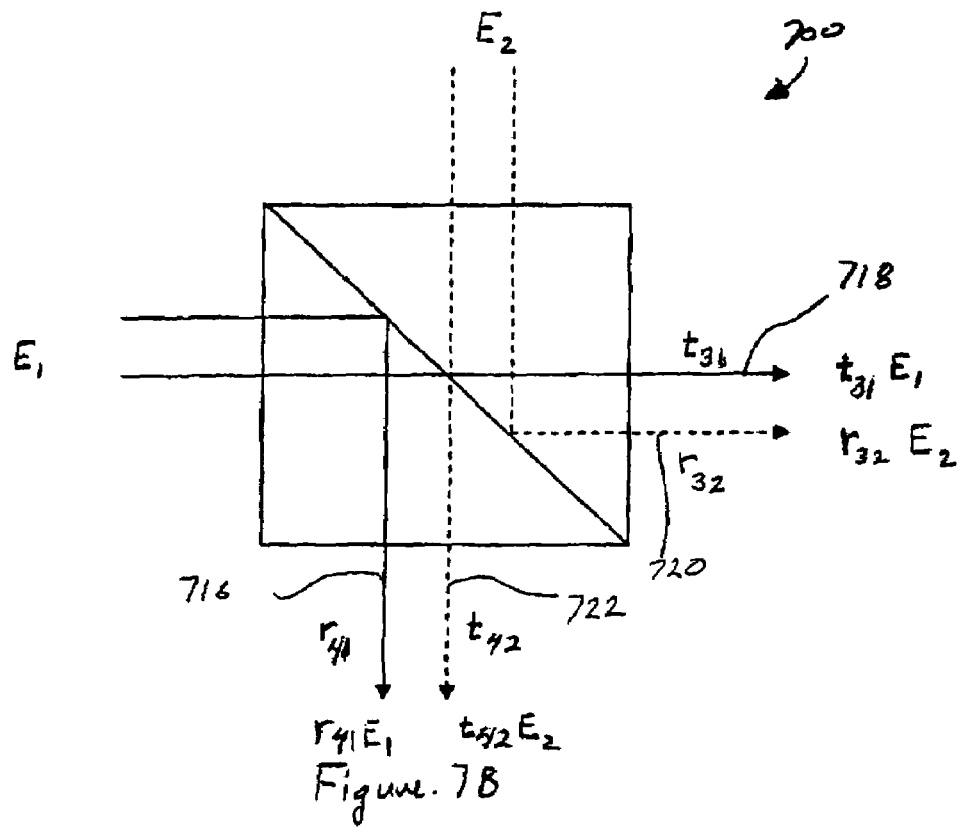
FIG. 7B illustrates reflections and transmissions of two electric fields input to the beamsplitter shown in FIG. 7A.

Optical beamsplitters are prominent components of optical signal-based computing and information processing systems. FIG. 7A illustrates a representation of an optical beamsplitter 700. The beamsplitter 700 can be fabricated from a dielectric layer 702 that is sandwiched between two prisms 704 and 706. Directional arrows represent input and output channels. For example, directional arrows 708 and 710 represent input channels for inputting electric fields $E_1$ and $E_2$, and directional arrows 712 and 714 represents output channels for outputting electric fields $E_3$ and $E_4$. The input electric fields $E_1$ and $E_2$ are linearly related to the output electric fields $E_3$ and $E_4$ by the matrix equation:

$$\begin{bmatrix} E_3 \\ E_4 \end{bmatrix} = \begin{bmatrix} t_{31} & r_{32} \\ r_{41} & t_{42} \end{bmatrix} \begin{bmatrix} E_1 \\ E_2 \end{bmatrix}$$

where the reflection coefficients $r_{31}$ and $r_{42}$, and the transmission coefficients $t_{41}$ and $t_{32}$ are complex valued quantities. FIG. 7B illustrates reflections and transmissions of the electric fields $E_1$ and $E_2$ input to the beamsplitter 700. Directional arrows 716 and 718 represent reflection and transmission paths of the electric field $E_1$, respectively, and $r_{41}E_1$ and $t_{31}E_1$ represent quantities of the electric field $E_1$ that are reflected and transmitted, respectively. Dashed-line directional arrows 720 and 722 represent reflection and transmission paths of the electric field $E_2$, respectively, and $r_{32}E_2$ and $t_{42}E_2$ represent quantities of the electric field $E_2$ that are reflected and transmitted, respectively.

Properties of the reflection and transmission coefficients can be determined by assuming that the total flow of energy into the beamsplitter 700 is equal to the total flow of energy output from the beamsplitter 700, which is represented by:

$$|E_3|^2 + |E_4|^2 = |E_1|^2 + |E_2|^2$$

As a result, the reflection and transmission coefficients are related by:

$$|r_{41}|^2 + |t_{31}|^2 = |r_{32}|^2 + |t_{42}|^2 = 1,$$

$$t_{31}r^*_{32} + r_{41}t^*_{42} = r_{32}t^*_{31} + t_{42}r^*_{41} = 0$$

and the matrix $$U_{BS} = \begin{bmatrix} t_{31} & r_{32} \\ r_{41} & t_{42} \end{bmatrix}$$

is a unitary matrix that satisfies:

$$U_{BS}U_{BS}^\dagger = U_{BS}^\dagger U_{BS} = \overline{I}$$

where $U_{BS}^\dagger$ is the inverse of the matrix $U_{BS}$ and is given by:

$$U_{BS}^\dagger = \begin{bmatrix} t^*_{31} & r^*_{41} \\ r^*_{32} & t^*_{42} \end{bmatrix}, \text{ and}$$

$\overline{I}$ represents a 2 by 2 identity matrix.

By varying the composition of the dielectric layer 702, beamsplitters can be fabricated so that different quantities of the electric field are reflected and transmitted. For example, a beamsplitter can be fabricated with a dielectric layer that reflects 50% and transmits 50% of an input electric field. The beamsplitter is called a "50:50 beamsplitter," and an example of the reflection and transmission coefficients are given by:

$$U_{BS} = \frac{1}{\sqrt{2}} \begin{bmatrix} 1 & 1 \\ -1 & 1 \end{bmatrix}$$

Beamsplitters also play an important role in the quantum-mechanical treatment of electromagnetic radiation. The relations satisfied by the reflection and transmission coefficients for a classical electric field are retained for a quantized electric field. For example, the creation operators can be used to characterize photon states that are input to and output from a beamsplitter, where output creation operators are related to input creation operators by the following matrix equation:

$$\begin{bmatrix} \hat{a}_3^\dagger \\ \hat{a}_4^\dagger \end{bmatrix} = \begin{bmatrix} t_{31} & r_{32} \\ r_{41} & t_{42} \end{bmatrix} \begin{bmatrix} \hat{a}_1^\dagger \\ \hat{a}_2^\dagger \end{bmatrix}$$

Because the matrix $U_{SB}$ is unitary, the input creation operators are related to the output creation operators as follows:

$$\begin{bmatrix} \hat{a}_1^\dagger \\ \hat{a}_2^\dagger \end{bmatrix} = \begin{bmatrix} t^*_{31} & r^*_{41} \\ r^*_{32} & t^*_{42} \end{bmatrix} \begin{bmatrix} \hat{a}_3^\dagger \\ \hat{a}_4^\dagger \end{bmatrix}$$

Figure 8:
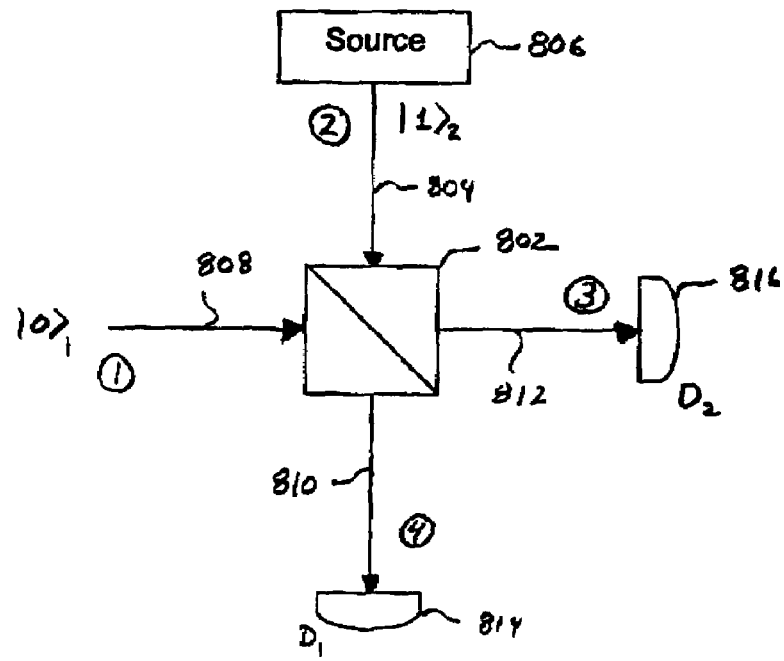
FIG. 8 illustrates a 50:50 beamsplitter that receives a photon in a first input channel and a vacuum state in a second input channel.

In quantum optics, a beamsplitter converts photon states into a coherent linear superposition of states. FIG. 8 illustrates a 50:50 beamsplitter 802 that receives a photon in an input channel 804 from a source 806 and a vacuum state in an input channel 808. The input state applied to the beamsplitter 802 is represented by a tensor product $|0\rangle_1|1\rangle_2$, where the subscripts 1 and 2 designate the input channels 808 and 804, respectively. Using the 50:50 beamsplitter matrix above, the input and output creation operators are related by the following matrix equations:

$$\begin{bmatrix} \hat{a}_3^\dagger \\ \hat{a}_4^\dagger \end{bmatrix} = \frac{1}{\sqrt{2}} \begin{bmatrix} 1 & 1 \\ -1 & 1 \end{bmatrix} \begin{bmatrix} \hat{a}_1^\dagger \\ \hat{a}_2^\dagger \end{bmatrix}, \text{ and}$$

$$\begin{bmatrix} \hat{a}_1^\dagger \\ \hat{a}_2^\dagger \end{bmatrix} = \frac{1}{\sqrt{2}} \begin{bmatrix} 1 & -1 \\ 1 & 1 \end{bmatrix} \begin{bmatrix} \hat{a}_3^\dagger \\ \hat{a}_4^\dagger \end{bmatrix}$$

The output state of the 50:50 beamsplitter is determined as follows:

$$|0\rangle_1|1\rangle_2 = \hat{a}_2^\dagger|0\rangle_1|0\rangle_2 \xrightarrow{BS} \frac{1}{\sqrt{2}}(\hat{a}_3^\dagger + \hat{a}_4^\dagger)|0\rangle_3|0\rangle_4$$

$$= \frac{1}{\sqrt{2}}(|1\rangle_3|0\rangle_4 + |0\rangle_3|1\rangle_4)$$

where the subscripts 4 and 3 correspond to the output channels 810 and 812, respectively, and $|0\rangle_1|0\rangle_2 \xrightarrow{BS} |0\rangle_3|0\rangle_4$. The state $|1\rangle_3|0\rangle_4$ represents a photon in the output channel 812 and no photon in the output channel 810, and the state $|0\rangle_3|1\rangle_4$ represents a photon in the output channel 810 and no photon in the output channel 812. The photon remains in the coherent linear superposition of states $$\frac{1}{\sqrt{2}}(|1\rangle_3|0\rangle_4 + |0\rangle_3|1\rangle_4)$$

until the photon is detected at either photon detector $D_1$ 814 or photon detector $D_2$ 816. The square of the coefficient $1/\sqrt{2}$ indicates that there is a ½ probability of detecting the photon at the detector $D_1$ 814 and a ½ probability of detecting the photon at the detector $D_2$ 816.

Figure 9:
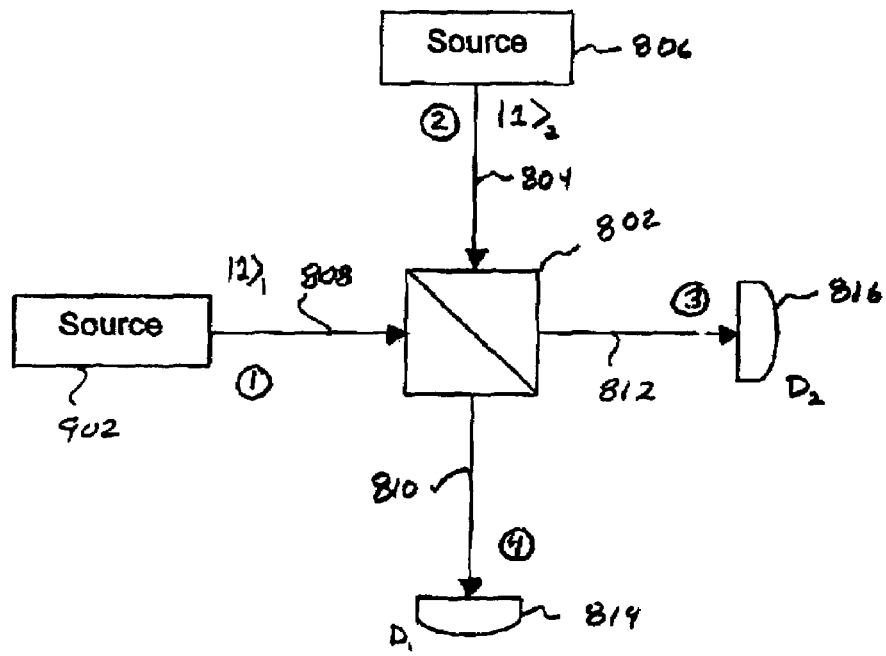
FIG. 9 illustrates a 50:50 beamsplitter that simultaneously receives a photon in a first input channel and a photon in a second input channel.

Beamsplitters can also cause wave-like interference between photons that simultaneously enter the beamsplitter. FIG. 9 illustrates a 50:50 beamsplitter 802 that simultaneously receives a photon in the input channel 804 from the source 806 and a photon in the input channel 808 from a source 902. Using the input creation operator relations above, and the commutation relation $[a_3^\dagger, a_4^\dagger]=0$, the output from the beamsplitter 802 is determined as follows:

$$|1\rangle_1|1\rangle_2 = a_1^\dagger a_2^\dagger |0\rangle_1|0\rangle_2 \xrightarrow{BS} \frac{1}{2}(\hat{a}_3^\dagger - \hat{a}_4^\dagger)(\hat{a}_3^\dagger + \hat{a}_4^\dagger)|0\rangle_3|0\rangle_4 \xrightarrow{BS}$$
$$\frac{1}{2}(\hat{a}_3^\dagger \hat{a}_3^\dagger - \hat{a}_4^\dagger \hat{a}_4^\dagger)|0\rangle_3|0\rangle_4 = \frac{1}{\sqrt{2}}(|2\rangle_3|0\rangle_4 - |0\rangle_3|2\rangle_4)$$

The state $|2\rangle_3|0\rangle_4$ represents two photons that are output together in the output channel 812 and no photon in the output channel 810, and the state $|0\rangle_3|2\rangle_4$ represents two photons in the output channel 810 and no photon in the output channel 812. The state $|1\rangle_3|1\rangle_4$ is not output from the beamsplitter 802, because wave-like interference between the two photons cancels the product state $|1\rangle_3|1\rangle_4$ and is called "bunching." Bunching is an effect that arises because photons are bosons and so their operators obey the commutation relations. As a result, the detectors 814 and 816 do not simultaneously detect a photon.

Figure 10:
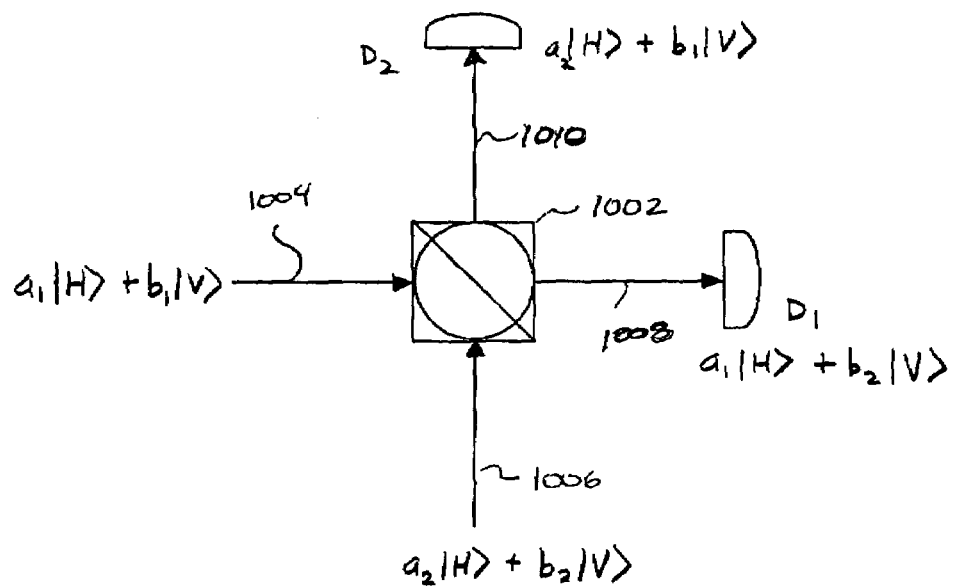
FIG. 10 illustrates an example of a polarizing beamsplitter that receives linear superposition of states comprising both vertically and horizontally polarized photons in both input channels.

A polarizing beam splitter refracts vertically polarized electromagnetic radiation and transmits horizontally polarized electromagnetically radiation. FIG. 10 illustrates an example of a polarizing beamsplitter 1002 that receives two linear superpositions of states, each linear superposition comprising vertically and horizontally polarized photons. A linear superposition of states $a_1|V\rangle+b_1|H\rangle$ is input in input channel 1004, and a linear superposition of states $a_2|V\rangle+b_2|H\rangle$ is input in input channel 1006. The polarizing beamsplitter outputs the linear superposition of states $a_1|V\rangle+b_2|H\rangle$ in output channel 1008 and outputs the linear superposition of states $a_1|V\rangle+b_2|H\rangle$ in output channel 1010.

Figure 11A:
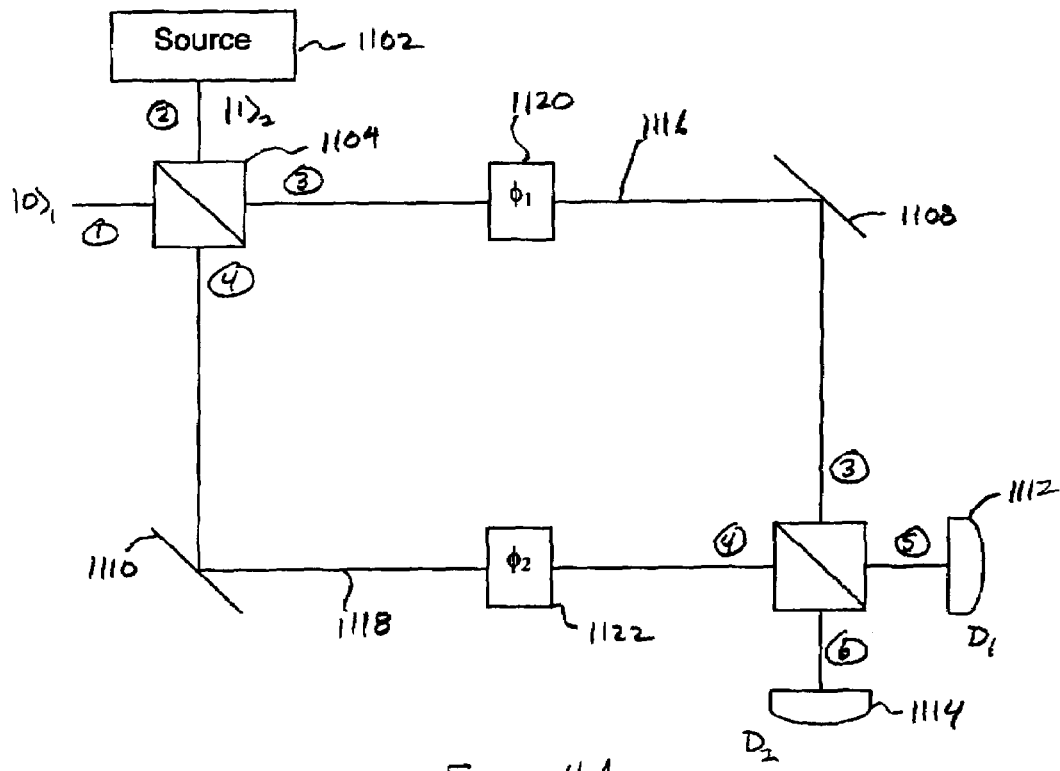
FIG. 11A illustrates a Mach-Zehnder interferometer.

As described above with reference to FIGS. 8-10, because the beamsplitter is a device that outputs a coherent linear superposition of states, it is not possible to determine in advance which detector will detect the photon. However, two beamsplitters can be combined to fabricate a system, called a "Mach-Zehnder interferometer" ("MZ"), that allows one to select in advance which detector will detect the photon. FIG. 11A illustrates a MZ interferometer. The MZ interferometer is composed of a photon source 1102, a first 50:50 beamsplitters $BS_1$ 1104, a second 50:50 beamsplitter $BS_2$ 1106, two mirrors 1108 and 1110, a first photon detector $D_1$ 1112, and a second photon detector $D_2$ 1114. Both the clockwise path 1116 and the counter-clockwise path 1118 include phase shifts that are represented by $\phi_1$ 1120 and $\phi_2$ 1122, respectively. A phase shift can be the result of a changed optical path length and is represented by the operator $\exp(i\phi\hat{n})$. In general, the phase-shift operator operates on a number state $|n\rangle$ as follows:

$$\exp(i\phi\hat{n})|n\rangle = \exp(i\phi n)|n\rangle$$

The first beamsplitter $BS_1$ 1104 receives the input state $|0\rangle_1|1\rangle_2$ and ba outputs the coherent linear superposition of states:

$$|0\rangle_1|1\rangle_2 \xrightarrow{BS} \frac{1}{\sqrt{2}}(|1\rangle_3|0\rangle_4 + |0\rangle_3|1\rangle_4)$$

as described above with reference to FIG. 8. Because the paths 1116 and 1118 each include a phase shift, the phase shift operators $\exp(i\phi_1 \hat{n})$ and $\exp(i\phi_2 \hat{n})$ are applied to the coherent linear superposition of states to give:

$$\xrightarrow{\phi_1, \phi_2} \frac{1}{\sqrt{2}}(e^{i\phi_1}|1\rangle_3|0\rangle_4 + e^{i\phi_2}|0\rangle_3|1\rangle_4)$$

The second beamsplitter $BS_2$ 1106 transforms each state within the coherent linear superposition of states as follows:

$$|1\rangle_3|0\rangle_4 \xrightarrow{BS_2} \frac{1}{\sqrt{2}}(|1\rangle_5|0\rangle_6 + |0\rangle_5|1\rangle_6)$$
$$|0\rangle_3|1\rangle_4 \xrightarrow{BS_2} \frac{1}{\sqrt{2}}(|1\rangle_5|0\rangle_6 - |0\rangle_5|1\rangle_6)$$

As a result, the MZ interferometer outputs the coherent linear superposition of states given by:

$$|0\rangle_1|1\rangle_2 \rightarrow \frac{1}{2}(e^{i\phi_1} + e^{i\phi_2})|1\rangle_5|0\rangle_6 + \frac{1}{2}(e^{i\phi_1} - e^{i\phi_2})|0\rangle_5|1\rangle_6$$

The probability distribution associated with detecting the output state $|1\rangle_5|0\rangle_6$ at the detector $D_1$ 1112 is given by:

$$P_{D_1} = \frac{1}{4}|e^{i\phi_1} + e^{i\phi_2}|^2 = \frac{1}{2}(1 + \cos(\phi_1 - \phi_2))$$

and the probability distribution associated with detecting the output state $|0\rangle_5|1\rangle_6$ at the detector $D_2$ 1114 is given by:

$$P_{D_2} = \frac{1}{4}|e^{i\phi_1} + e^{i\phi_2}|^2 = \frac{1}{2}(1 - \cos(\phi_1 - \phi_2))$$

where the quantity $(\phi_1-\phi_2)$ is the phase difference between the clockwise and counter-clockwise paths 1116 and 1118.

Figure 11B:
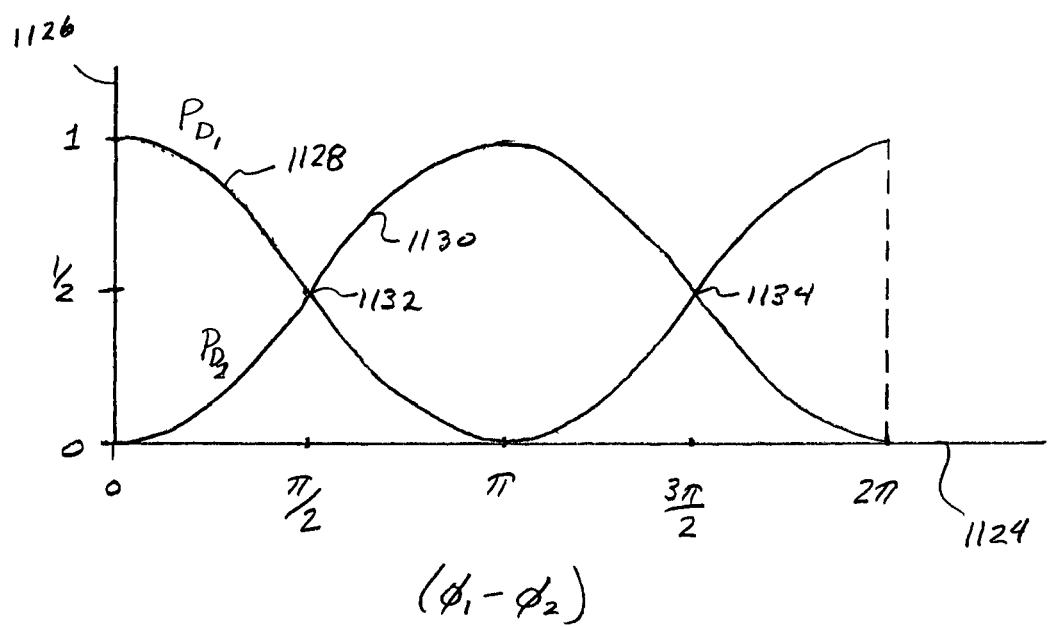
FIG. 11B is a plot of probability distributions associated with detecting output states of the Mach-Zehnder interferometer shown in FIG. 11A.

FIG. 11B is a plot of probability distributions $P_{D_1}$ and $P_{D_2}$ that are associated with detecting the output states of the MZ interferometer shown in FIG. 11A. In FIG. 11B, a relative phase difference $(\phi_1-\phi_2)$ is plotted with respect to a horizontal axis 1124, and a range of probabilities is plotted with respect to a vertical axis 1126. A curve 1128 represents the probability distribution $P_{D_1}$, and a curve 1130 represents the probability distribution $P_{D_2}$. Intersection points 1132 and 1134 correspond to the phase differences $\pi/2$ and $3\pi/2$ and represent a ½ probability of detecting the photon at either the detector $D_1$ 1112 or the detector $D_2$ 1114. The probability distribution $P_{D_1}$ 1128 shows that for a phase difference equal to 0 or $2\pi$, the probability is 1 that the photon is detected at the detector $D_1$ 1112. The probability distribution $P_{D_2}$ 1126 shows that, for a phase difference equal to $\pi$, the probability is 1 that the photon is detected at the detector $D_2$ 1114.

Figure 12:
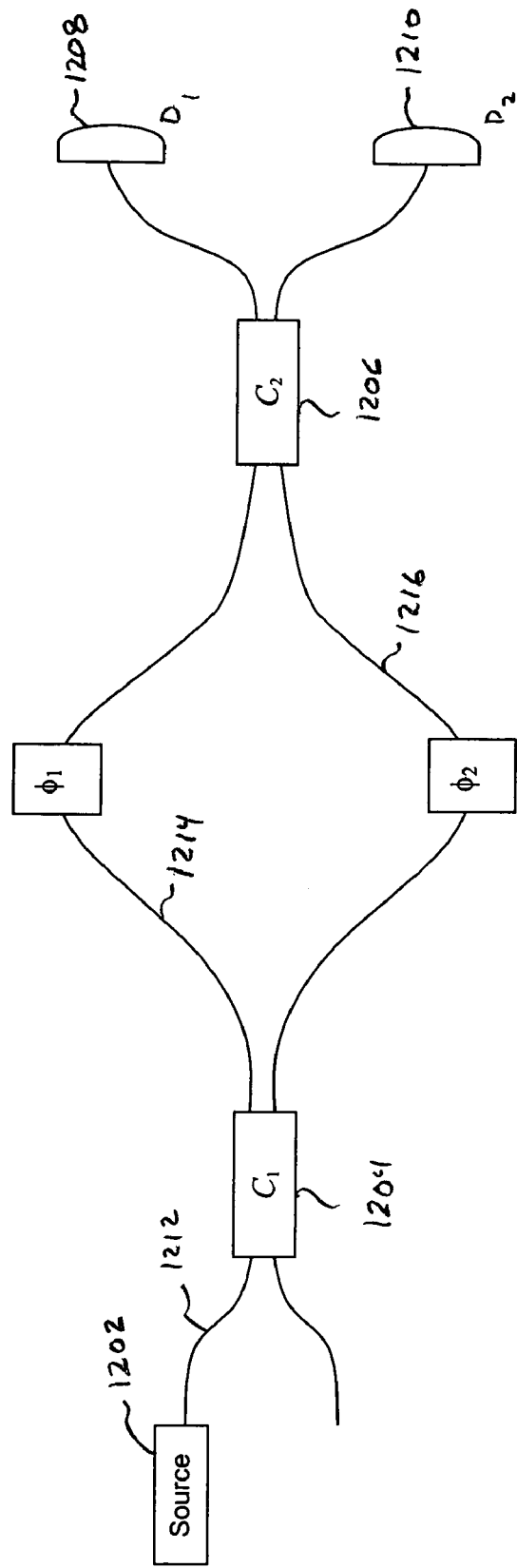
FIG. 12 illustrates a coupler and optical-fiber-based implementation of the Mach-Zehnder interferometer shown in FIG. 11A.

The MZ interferometer can also be implemented using couplers and optical fibers. FIG. 12 illustrates a coupler and optical-fiber-based implementation of the MZ interferometer shown in FIG. 11A. In FIG. 12, the MZ interferometer is composed of a photon source 1202, a first coupler 1204, a second coupler 1206, a first photon detector $D_1$ 1208, and a second photon detector $D_2$ 1110. Optical fibers, such as optical fiber 1212, are used to transport photons generated by the source 1202. The couplers 1204 and 1206 can be fabricated to operate as 50:50 beamsplitters, as described above with reference to the beamsplitters 1104 and 1106 in FIG. 11A. The optical path length of the fibers 1214 and 1216 can be lengthened or shortened to control the relative phase difference $(\phi_1-\phi_2)$ so that a particular detector, $D_1$ 1208 or $D_2$ 1210, can be selected in advance to detect the photon output from the coupler 1206, as described above with reference to FIG. 11B.

An Overview of Electromagnetic and Quantum-Based Representations of Data

A bit is a basic unit of information used by computational systems to process information and store information in information-storage devices. The bit is equivalent to a choice between two mutually exclusive alternatives, such as "on" and "off," and is typically represented by the numbers 0 or 1. Information encoded in bits is called "classical information." Bits can be encoded in an electromagnetic wave by modulating the amplitude, frequency, or phase of the electromagnetic wave. The modulated electromagnetic waves can then be transmitted over large distances in optical fibers, waveguides, or through free space, and decoded by a demodulator. Amplitude modulation is used to encode information by changing the strength or magnitude of the the electromagnetic signal. Frequency modulation is used to encode information by varying the frequency of the electromagnetic signal. Phase modulation is used to encode information by shifting the phase of the electromagnetic signal.

Information can also be encoded in discrete, or continuous, states of quantum systems, including electrons, atoms, and photons of electromagnetic radiation. Information encoded in the discrete states of a quantum system is called "quantum information." An elementary quantum system has two discrete states and is called a "qubit." The qubit "basis states" are represented by "$|0\rangle$" and "$|1\rangle$" and are used to represent the bits 0 and 1, respectively. However, unlike the systems used to realize bits in classical information, such a quantum system can be in the state $|0\rangle$, the state $|1\rangle$, or in a state that simultaneously comprises both $|0\rangle$ and $|1\rangle$. These qubit states are represented by a linear superposition of states:

$$|\psi\rangle = \alpha|0\rangle + \beta|1\rangle$$

The parameters $\alpha$ and $\beta$ are complex-valued coefficients satisfying the condition:

$$|\alpha|^2+|\beta|^2=1$$

where $|\alpha|^2$ is the probability of measuring the state $|0\rangle$, and $|\beta|^2$ is the probability of measuring the state $|1\rangle$.

Figure 13A:
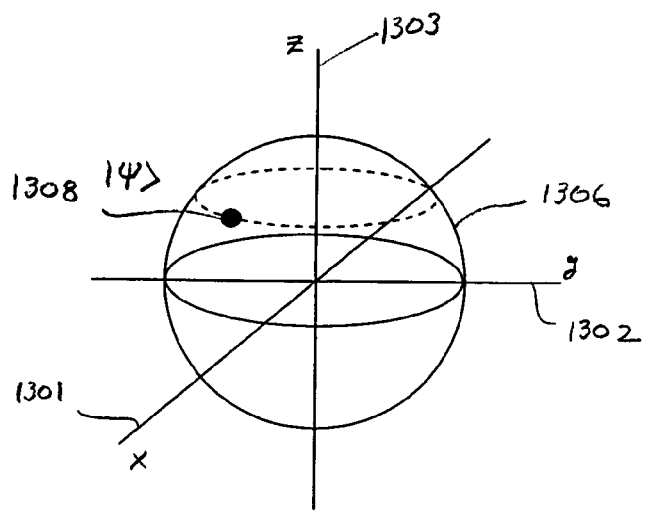
FIGS. 13A-13C illustrate a Bloch sphere representation of a qubit.
Figure 13B:
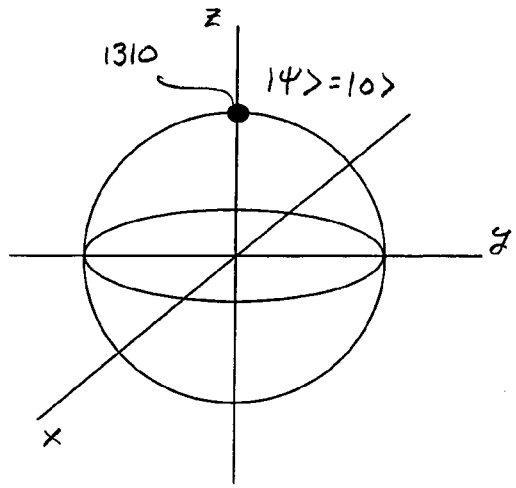
Figure 13C:
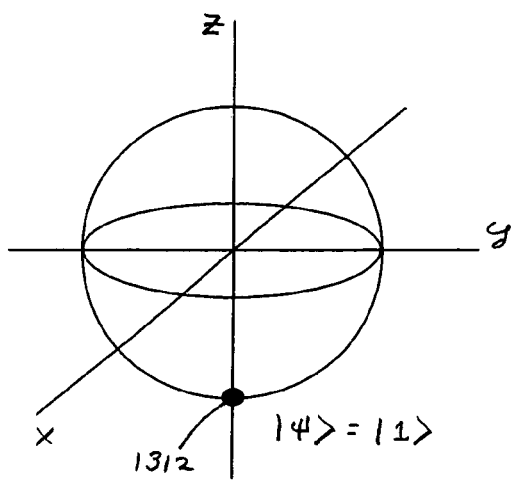

A qubit can exist in any one of an infinite number of linear superpositions until the qubit is measured. When the qubit is measured in the computational basis $|0\rangle$ and $|1\rangle$, the qubit is projected into either the state $|0\rangle$ or the state $|1\rangle$. The infinite number of qubit-linear superpositions can be geometrically represented by a unit-radius, three-dimensional sphere called a "Bloch sphere":

$$|\psi\rangle = \cos\left(\frac{\theta}{2}\right)|0\rangle + e^{i\phi}\sin\left(\frac{\theta}{2}\right)|1\rangle$$

where $-\pi/2<\theta<\pi/2$ and $0<\phi\leq\pi$. FIGS. 13A-13C illustrate a Bloch sphere representation of a qubit. In FIG. 13A, lines 1301-1303 are the orthogonal x, y, and z Cartesian coordinate axes, respectively, and the Bloch sphere 1306 is centered at the origin. There are an infinite number of points on the Bloch sphere 1306, each point representing a unique linear superposition of the qubit $|\psi\rangle$. For example, a point 1308 on the Bloch sphere 1306 represents a qubit $|\psi\rangle$ comprising in part the state $|0\rangle$ and in part the state $|1\rangle$. However, once the state of the qubit $|\psi\rangle$ is projected in the computational basis $|0\rangle$ and $|1\rangle$, the qubit $|\psi\rangle$ is projected into the state $|0\rangle$ 1310, in FIG. 13B, or the state $|1\rangle$ 1312, in FIG. 13C.

Figure 14:
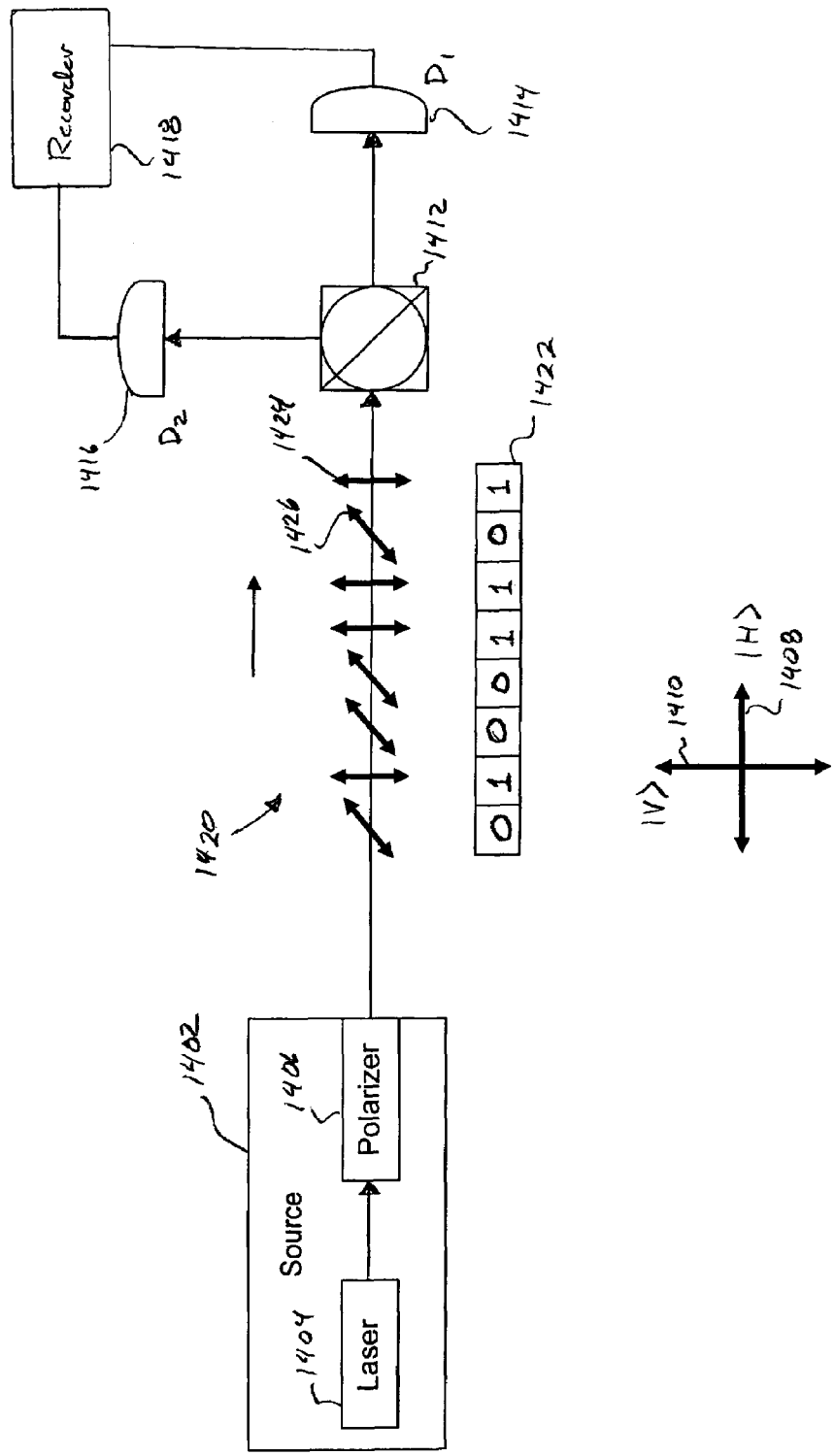
FIG. 14 illustrates an example of encoding and decoding qubits in polarization states of photons.

Quantum computing and quantum information processing systems may employ optical qubits to encode information. The polarization states of photons can be used to represent optical qubits. FIG. 14 illustrates an example of encoding and decoding qubits in polarization states of photons. In FIG. 14, a photon source 1402 includes a pulsed laser 1404 and a polarizer 1406. The pulse laser 1404 generates photons at regular time intervals and transmits the photons to the polarizer 1406. The polarizer 1406 is synchronized with the pulsed laser 1404 so that as photons pass through the polarizer 1406, each photon is polarized in either a first direction or polarized in a second direction that is orthogonal to the first direction. For example, double headed arrows 1408 and 1410 correspond to orthogonal horizontal and vertical polarization directions of photon polarizations output from the polarizer 1406. The two orthogonal polarization states of a photon can be used to represent bits 0 and 1. For example, horizontally polarized photons $|H\rangle$ can represent the bit 0, and vertically polarized photons $|V\rangle$ can represent the bit 1. As the polarized photons reach a polarizing beamsplitter 1412, horizontally polarized photons $|H\rangle$ are directed to a detector $D_1$ 1414, and vertically polarized photons $|V\rangle$ are directed to a detector $D_2$ 1416. The detectors 1414 and 1416 can both be located the same distance from the polarizing beamsplitter 1412 so that when a photon strikes the detector 1414, the bit 0 is recorded by a recorder 1418, and when a photon strikes the detector 1416, the bit 1 is recorded by the recorder 1418.

The source 1402 can be used to encode binary numbers, and the polarizing beamsplitter 1412 and the detectors 1414 and 1416 can be used to decode a binary number. For example, the horizontally and vertically polarized photons 1420 output from the source 1402 represent the binary number "01001101" 1422. The binary values of the binary number 1418 can be determined by recording the order in which the detectors $D_1$ 1414 and $D_2$ 1416 detect photons output from the polarizing beamsplitter 1412. For example, the first vertically polarized photon 1424 is input to the polarizing beamsplitter 1412, output to the detector $D_2$ 1416, and recorded by the recorder 1418. At a later time, the second horizontally polarized photon 1426 is input to the polarizing beamsplitter 1412, output to the detector 1414, and recorded by the recorder 1418. The recorder 1418 records a 1 followed by a 0 for the first two bits in the binary number 1422.

Figure 15:
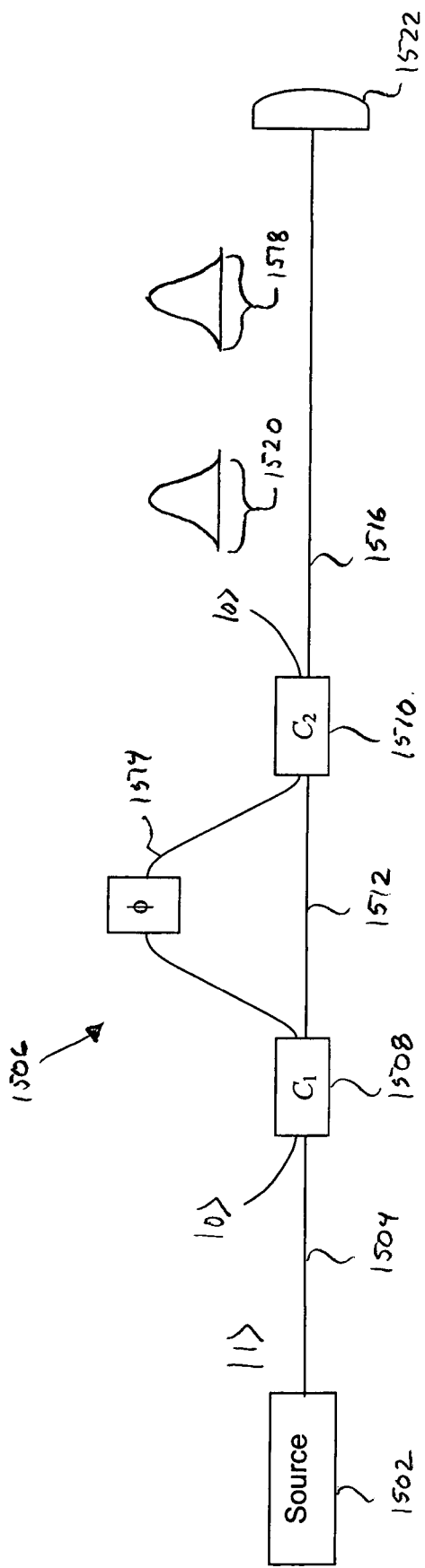
FIG. 15 illustrates an example of encoding and decoding qubits in time-bins.

Qubits can also be realized by generating time-bin qubits. Time-bin qubits are formed by a coherent linear superposition of states. FIG. 15 illustrates an example of encoding and decoding of time-bin qubits. In FIG. 15, a source 1502 outputs a photon into an optical fiber 1504. The photon is input to a MZ interferometer 1506 that is composed of two couplers 1508 and 1510, a short optical fiber 1512, and a long optical fiber 1514. The difference in the lengths of the optical fibers 1512 and 1514 creates a phase difference $\phi$. The MZ interferometer 1506 outputs the following coherent linear superposition of states into the optical fiber 1516:

$$|1\rangle|0\rangle \xrightarrow{MZ} \frac{1}{\sqrt{2}}(e^{i\phi}|0, 1\rangle + |1, 0\rangle)$$

where the states correspond to |short fiber,long fiber⟩. The state $|1,0\rangle$ corresponds to the photon in a first time bin 1518 that passed through the short optical fiber 1512, and the state $|0,1\rangle$ corresponds to the photon in a second time bin 1520 that passed through the long optical fiber 1514. The time bins 1518 and 1520 are separated by a time difference that is larger than the length of each time bin. The state $|1,0\rangle$ can be assigned the binary value "1," and the state $|0,1\rangle$ can be assigned the binary value "0." When a photon is detected in the time bin 1518, the bit is measured to have the value "1," and when a photon is detected in time bin 1520, the bit is measured to have the value "0." Bits can be created by adjusting the phase difference $\phi$, as described above with reference to FIGS. 11A-11B.

Embodiments of the Present Invention

Various embodiments of the present invention are directed to methods and systems for circumventing transmission-channel disruptions in transmission channels that can be used for both classical and quantum-based representations of information. In addition, the present invention can be used to reduce noise in information transmission channels, as described in the Patent application: "Handling Noise In a Noisy Environment," international publication No. WO 02/30030 A2, filed Oct. 2, 2001. The transmission-channel disruptions can be due to any event that disrupts the transmission of information over transmission channels, including cutting or eavesdropping. The embodiments of the present invention circumvent transmission-channel disruptions by distributing information encoded in signals in a number of separate transmission channels. As a result, when one or more of the transmission channels is disrupted, the remaining transmission channels can be relied upon to complete the transmission of the information. Also, additional signals are produced in response to the disruptions and can be used to alert transmission channel users that a disruption has occurred in the transmission channels.

Figure 16A:
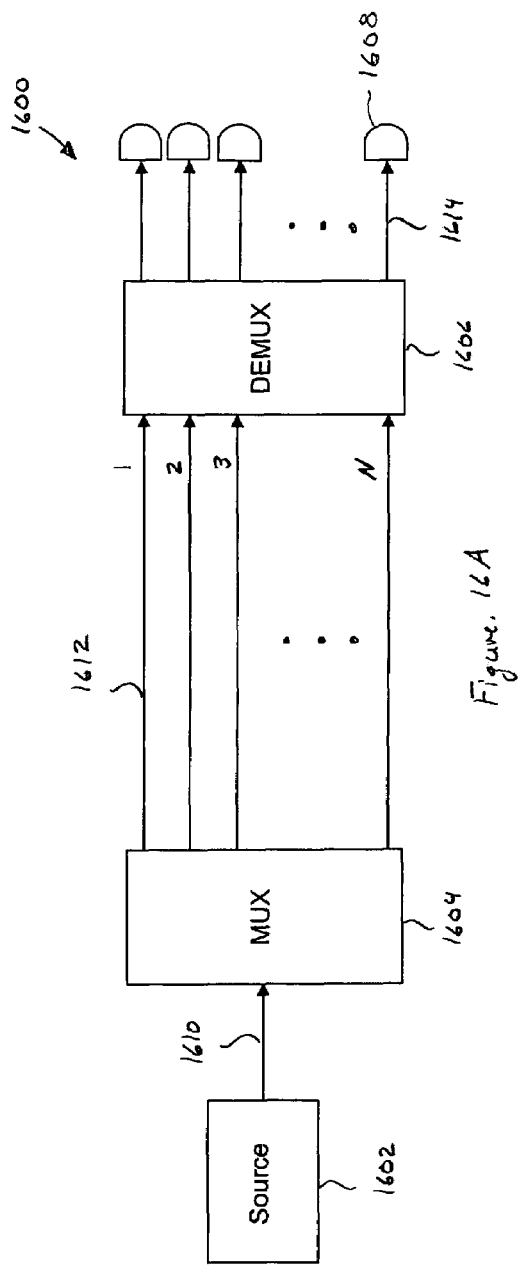
FIG. 16A illustrates a distribution system that distributes a signal in N transmission channels and represents one of many embodiments of the present invention.

FIG. 16A illustrates a distribution system 1600 that distributes a signal in a number of transmission channels and represents one of many embodiments of the present invention. The distribution system 1600 is composed of a source 1602, a multiplexer 1604, a demultiplexer 1606, and a number of detectors, such as detector 1608. The source 1602 outputs a signal in a source channel 1610 that is input to the multiplexer 1604. The signal can encode information in either a classical or a quantum-based representation of information, such as modulated electromagnetic waves or optical qubits. The multiplexer 1604 distributes the signal in N separate transmission channels represented by directional arrows, such as directional arrow 1612, where N is a positive number. The transmission channels can be optical fibers, free space, or any other medium that is suitable for transmitting signals. The signals carried by the N transmission channels are input to the demultiplexer 1606. The demultiplexer 1606 outputs signals to the detector 1608 in a receiver channel 1614. The multiplexer 1604 and the demultiplexer 1606 can be placed in the same room or different rooms in the same or in different locations that are tens, hundreds, or even thousands of miles apart. The distribution system 1600 circumvents a transmission-channel disruption by distributing the signal in the N transmission channels. When no transmission-channel disruption has occurred, the single detector 1608 detects the signal. However, when a disruption event occurs, the remaining detectors receive signals that can be used to immediately alert distribution system users of the transmission-channel disruption.

Figure 16B:
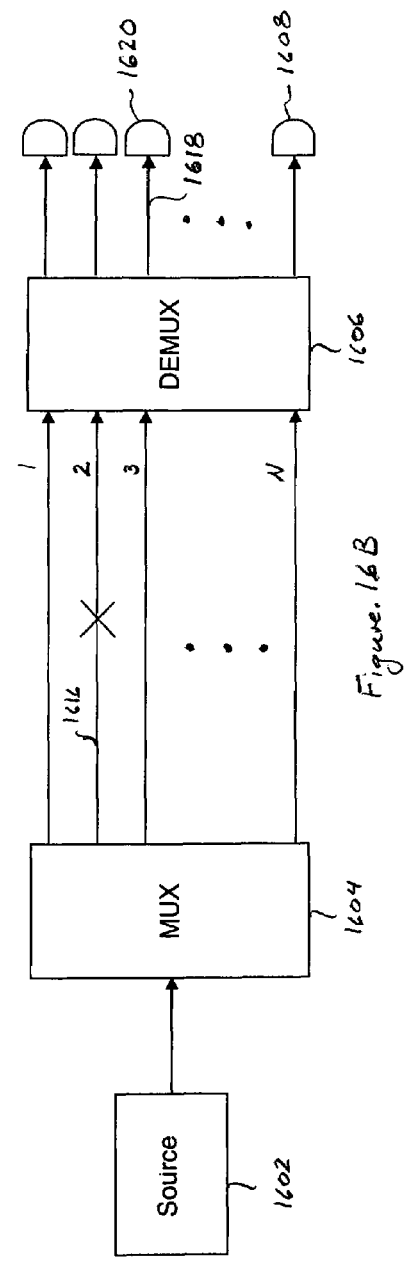
FIG. 16B illustrates an example of a distribution-system response to a transmission-channel disruption that represents one of many embodiments of the present invention.

FIG. 16B illustrates an example of a distribution-system response to a transmission-channel disruption that represents one of many embodiments of the present invention. When the transmission channel 1616 is disrupted, as indicated by "X," the remaining N−1 transmission channels complete the transmission of the signal to the demultiplexer 1606. The disruption may be the result of eavesdropping or other event that disrupts the transmission channel 1616. As a result of the disruption, the demultiplexer 1606 transmits a signal in receiver channel 1618 to the detector 1620. The signal received by detector 1620 can be used to alert distribution system users of the transmission-channel disruption.

Figure 17:
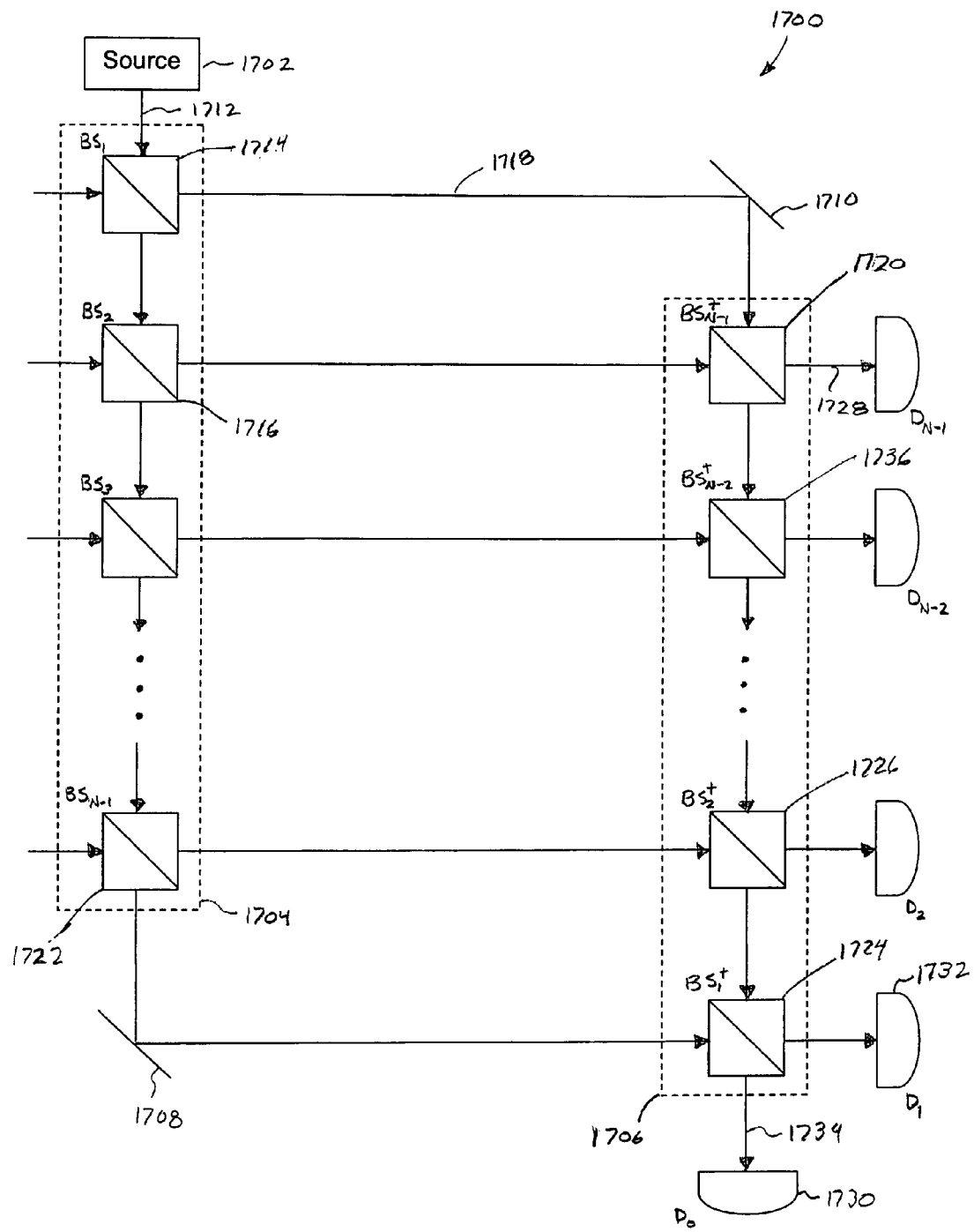
FIG. 17 illustrates an optical signal distribution system that represents one of many embodiments of the present invention.

FIG. 17 illustrates an optical signal distribution system 1700 that implements the distribution system 1600 and represents one of many embodiments of the present invention. The distribution system 1700 includes a source 1702, a multiplexer 1704, a demultiplexer 1706, two mirrors 1708 and 1710, and N detectors denoted by $D_0$–$D_{N-1}$. The multiplexer 1704 is composed of a column of N−1 beamsplitters denoted by $BS_1$–$BS_{N-1}$, and the demultiplexer 1706 is composed of a column of N−1 beamsplitters denoted by $BS_1^\dagger BS_{N-1}^\dagger$. Each beamsplitter in the multiplexer 1704 can receive an input signal in a source channel, transmit the signal to an adjacent beamsplitter, and transmit the signal in a transmission channel to a beamsplitter located in the demultiplexer 1706. For example, the beamsplitter $BS_1$ 1714 receives a signal in the source channel 1712 from the source 1702, transmits the signal to an adjacent beamsplitter $BS_2$ 1716, and transmits the signal in a transmission channel 1718 to a beamsplitter 1720 in the demultiplexer 1706. The beamsplitter $BS_{N-1}$ 1722 in the multiplexer 1704 transmits signals to two beamsplitters $BS_1^\dagger$ 1724 and $BS_2^\dagger$ 1726 in the demultiplexer 1706. Each beamsplitter in the demultiplexer 1706 can transmit signals to an adjacent beamsplitter and to an adjacent detector in a receiver channel identified by a directional arrow, such as directional arrow 1728. The beamsplitter $BS_1^\dagger$ 1724 transmits signals to detectors $D_0$ 1730 and $D_1$ 1732.

The beamsplitters $BS_1$-$BS_{N-1}$ in the multiplexer 1704 distribute the same fraction of the signal in each of the N transmission channels to the beamsplitters $BS_1^\dagger$-$BS_{N-1}^\dagger$ in the demultiplexer 1706. The beamsplitters $BS_1^\dagger$-$BS_{N-1}^\dagger$, are arranged and fabricated so that the signal is directed to the detector $D_0$ 1730 in the receiver channel 1734 and no signal is transmitted to the remaining detectors $D_1$-$D_{N-1}$. The receiver channel 1734 is also called the "useful channel." However, when one of the transmission channels is cut, a fraction of the signal is diverted to one or more of the detectors $D_1$-$D_{N-1}$. A signal received by one or more of the detectors $D_1$-$D_{N-1}$ can be used to notify transmission channel users that a particular transmission channel has been cut.

Figure 18A:
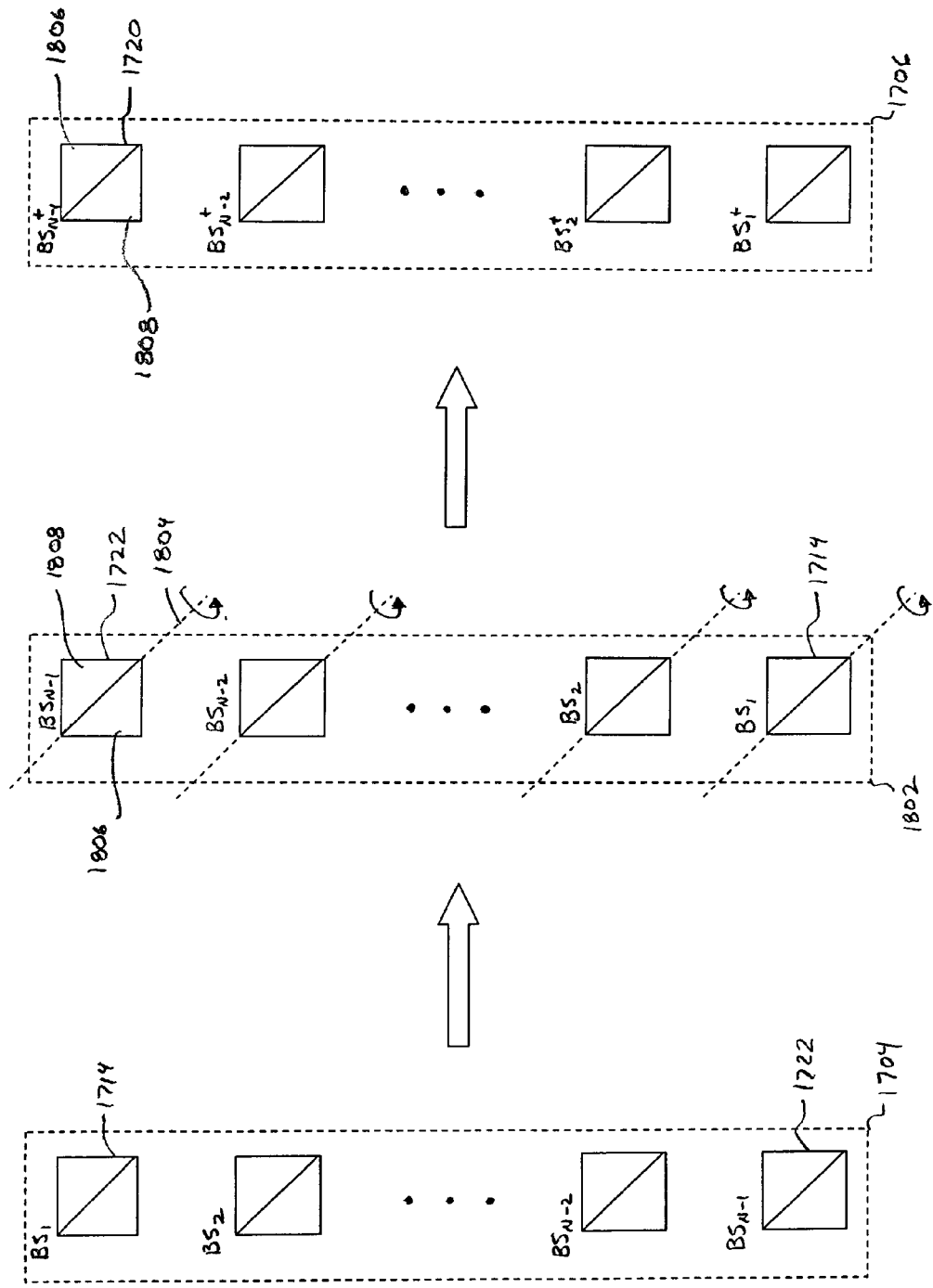
FIGS. 18A-18B illustrate determining an arrangement of beamsplitters in a demultiplexer, based on an arrangement of beamsplitters in a multiplexer of the optical signal distribution system shown in FIG. 17 that represents one of many embodiments of the present invention.
Figure 18B:
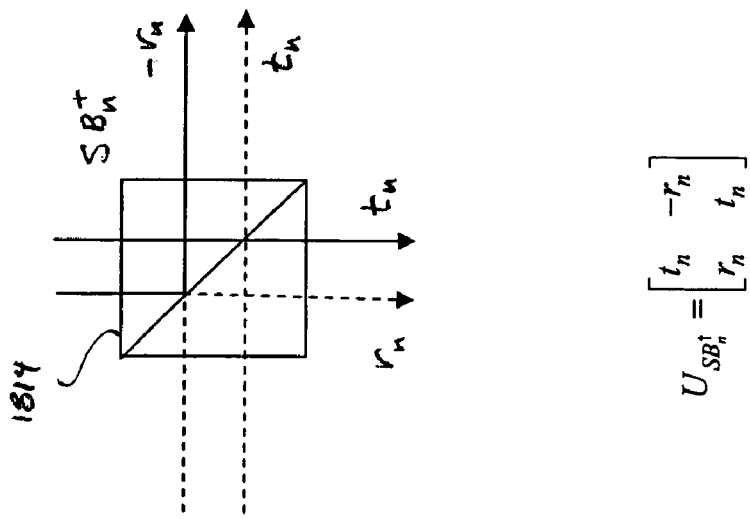
Figure 18B:
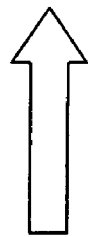
Figure 18B:
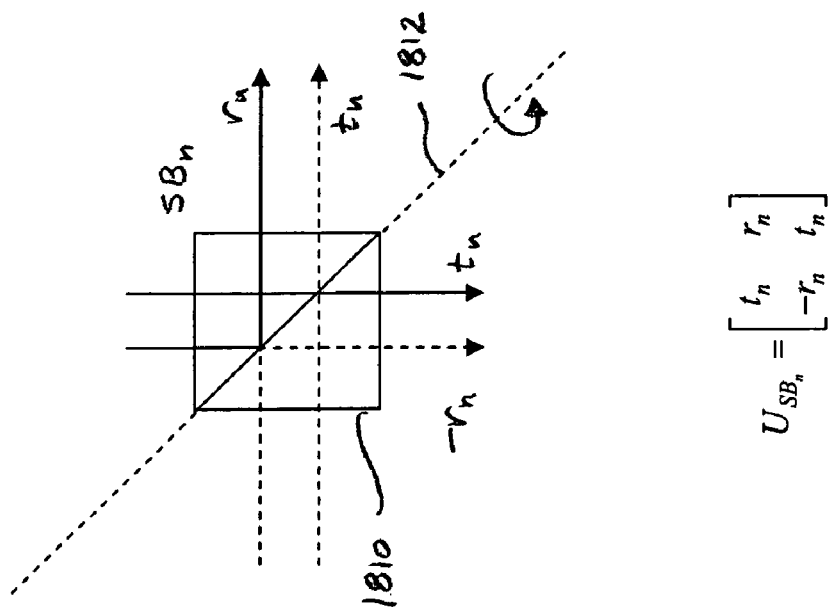

The arrangement of the column of beamsplitters comprising the multiplexer 1704 can used to determine the arrangement of the column of beamsplitters comprising the demultiplexer 1706. FIGS. 18A-18B illustrate determining an arrangement of the beamsplitters in the demultiplexer 1706 based on an arrangement of the beamsplitters in the multiplexer 1704 that represents one of many embodiments of the present invention. First, the top-to-bottom ordering of the column of beamsplitters $BS_1$-$BS_{N-1}$ is reversed to obtain the column of beamsplitters in an intermediate arrangement 1802. For example, the beamsplitter $BS_{N-1}$ 1722 is located at the bottom of the column of beamsplitters in the multiplexer 1704. After the order of the beamsplitters is reversed, the beamsplitter $BS_{N-1}$ 1722 is located at the top of the intermediate arrangement 1802. Next, each beamsplitter in the intermediate arrangement 1802 is rotated 180° about a rotation axis that lies in the plane of each beamsplitter and is located between the two prisms comprising each beamsplitter. For example, dashed line 1804 represents a rotation axis that lies in the plane of a beamsplitter $BS_{N-1}$ 1722 and between the two prisms 1806 and 1808. The beamsplitter $BS_{N-1}$ 1722 is rotated about the rotation axis 1804 to obtain the beamsplitter $BS_{N-1}^{\dagger}$ 1720 in the demultiplexer 1706.

The reflection and transmission coefficients associated with a beamsplitter $BS_n$ in the multiplexer 1704 can be represented by a beamsplitter matrix:

$$U_{BS_n} = \begin{bmatrix} t_n & r_n \\ -r_n & t_n \end{bmatrix}$$

where the coefficients $r_n$ and $t_n$ are real valued, satisfy the condition $r_n^2 + t_n^2 = 1$, and n is an integer value that ranges from 1 to N-1. Rotating the beamsplitter $BS_n$ 180° about a rotation axis, as described above with reference to FIG. 18A, is mathematically equivalent to taking the complex conjugate transpose of the associated beamsplitter matrix given by:

$$U_{BS_n}^{\dagger} = \begin{bmatrix} t_n & -r_n \\ r_n & t_n \end{bmatrix}$$

FIG. 18B illustrates reflection and transmission coefficients associated with a beamsplitter of the multiplexer 1704 and a change in the coefficients after the beamsplitter is rotated to obtain a beamsplitter in the demultiplexer 1706 that represents one of many embodiments of the present invention. In FIG. 18B, a beamsplitter $BS_n$ 1810 is rotated about a rotation axis 1812 to obtain a rotated beamsplitter $BS_n^{\dagger}$ 1814. The rotation is equivalent to a matrix transpose that results in changing the sign of the reflection coefficient $r_n$ and leaving the sign of the transmission coefficient $t_n$ unchanged.

The amount and type of dielectric material used in each beamsplitter of the multiplexer 1704 is selected so that the same fraction of the signal is transmitted in each of the N transmission channels. As a result, the beamsplitters in multiplexer 1704 each have different reflection and transmission coefficients. The demultiplexer 1706 recombines the signals transmitted in the N transmission channels and outputs a single signal in the useful channel 1734 to the detector $D_0$ 1730 in FIG. 17. A mathematical representation of the distribution system 1700 for a classical electrical field encoding of information is:

$$(E_0)^S \xrightarrow{MUX} \sum_{j=1}^{N} \frac{E_0}{\sqrt{N}} = \sum_{j=1}^{N} E_j^T \xrightarrow{DEMUX} (E_0)^R$$

where the superscripts S, T, and R denote the source, transmission, and receiver channels, $E_0$ is an electric field emitted by the source 1702, and $E_j^T$ is the portion of the electric field $E_0$ transmitted in the $j^{th}$ transmission channel.

Figure 19A:
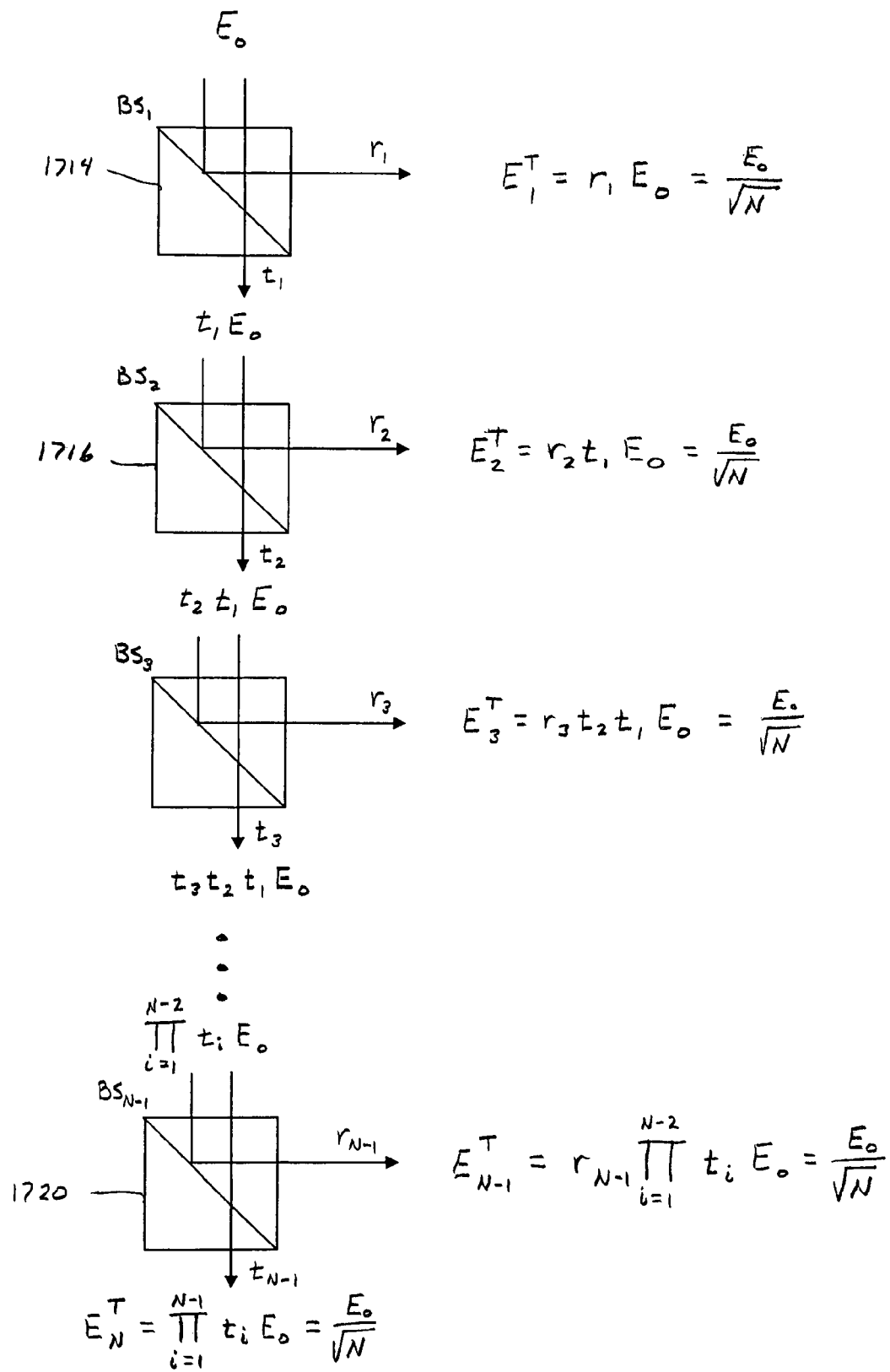
FIG. 19A shows reflections and transmissions of signals through beamsplitters in a multiplexer of an optical signal distribution system that represents an embodiment of the present invention.

FIG. 19A shows the reflections and transmissions of signals through the beamsplitters in the multiplexer 1704, in FIG. 17, that represents an embodiment of the present invention. An electric field $E_0$ is output from the source 1702 to beamsplitter $BS_1$ 1714. Each of the beamsplitters $BS_1$-$BS_{N-1}$ reflects and transmits part of the electric field $E_0$. The reflected and transmitted electric fields output by the beamsplitters in the multiplexer 1704 are $$r_k \prod_{i=1}^{K-1} t_i E_0 \text{ and } \prod_{i=1}^{K} t_i E_0,$$

respectively, where K is an integer value that ranges from 1 to N-1. For example, the beamsplitter $BS_1$ receives the electric field $E_0$ in a source channel. The beamsplitter $BS_1$ 1714 reflects and transmits the electric field $E_0$ to give a reflected output $r_1 E_0$ and a transmitted output $t_1 E_0$. The reflected output $r_1 E_0$ is transmitted in the transmission channel 1718 to the beamsplitter $BS_{N-1}^{\dagger}$ 1720, in FIG. 17, and the transmitted electric field $t_1 E_0$ is input to the adjacent beamsplitter $BS_2$ 1716. The beamsplitter $BS_2$ 1716 reflects and transmits the electric field $t_1 E_0$ to give reflected output $r_2 t_1 E_0$ and transmitted output $t_2 t_1 E_0$.

A general expression for the electric field reflected into each of the N transmission channels, in FIG. 19A, is:

$$E_K^T = r_K \prod_{i=1}^{K-1} t_i E_0$$

where $E_K^T$ represents the electric field transmitted in the $K^{th}$ transmission channel. Because the electric field $E_K^T$ is identical for each of the N transmission channels, the beam splitters in the multiplexer 1704 are fabricated so that the reflection and transmission coefficients $r_n$ and $t_n$ of each beamsplitter satisfy the following:

$$E_K^T = r_K \prod_{i=1}^{K-1} t_i = \frac{E_0}{\sqrt{N}},$$

$$E_N^T = \prod_{i=1}^{N-1} t_i = \frac{E_0}{\sqrt{N}}, \text{ and}$$

In FIG. 19A, the electric field transmitted in the N transmission channels are identical and represented by $E_0/\sqrt{N}$.

A general formula for the reflection and transmission coefficients $r_n$ and $t_n$ can be determined by considering the following:

$$\frac{E_{K+1}^T}{E_K^T} = 1 = \frac{r_{K+1} \prod_{i=1}^{K} t_i E_0}{r_K \prod_{i=1}^{K-1} t_i E_0} = \frac{r_{K+1} t_K}{r_K}$$

Substituting the equation:

$$r_K^2 + t_K^2 = 1$$

into the equation:

$$1 = \frac{r_{K+1} t_K}{r_K}$$

gives the recursive expression:

$$\frac{1}{r_{K+1}} = \sqrt{\left(\frac{1}{r_K}\right)^2 - 1} = \sqrt{\left(\frac{1}{r_1}\right)^2 - K}$$

Substituting K=n−1 gives the following general formulas for the reflection and transmission coefficients:

$$r_n = \frac{1}{\sqrt{N-n+1}}, \text{ and}$$

$$t_n = \sqrt{\frac{N-n}{N-n+1}}$$

Figure 19B:
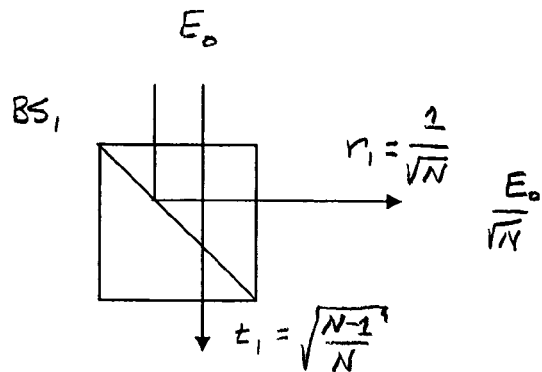
FIG. 19B shows reflection and transmission coefficients associated with the beamsplitters shown in FIG. 19A that represents one or many embodiments of the present invention.
Figure 19B:
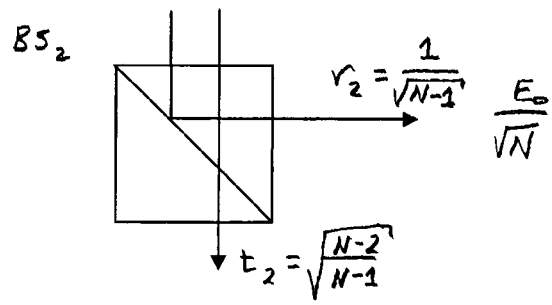
Figure 19B:
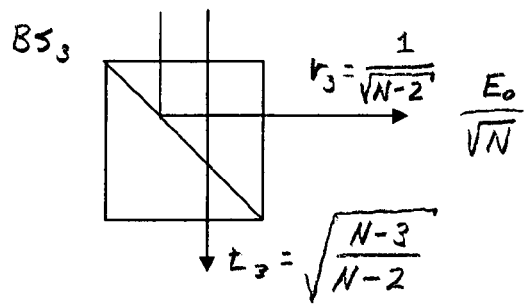
Figure 19B:
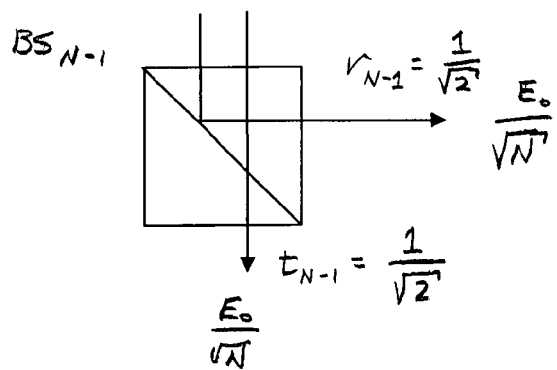

Beamsplitters in the multiplexer 1704 can fabricated with reflection and transmission properties that are in accordance with the reflection and transmission coefficients $r_n$ and $t_n$. FIG. 19B shows the reflection and transmission coefficients associated with the beamsplitters shown in FIG. 19A and represents one or many embodiments of the present invention.

Figure 20A:
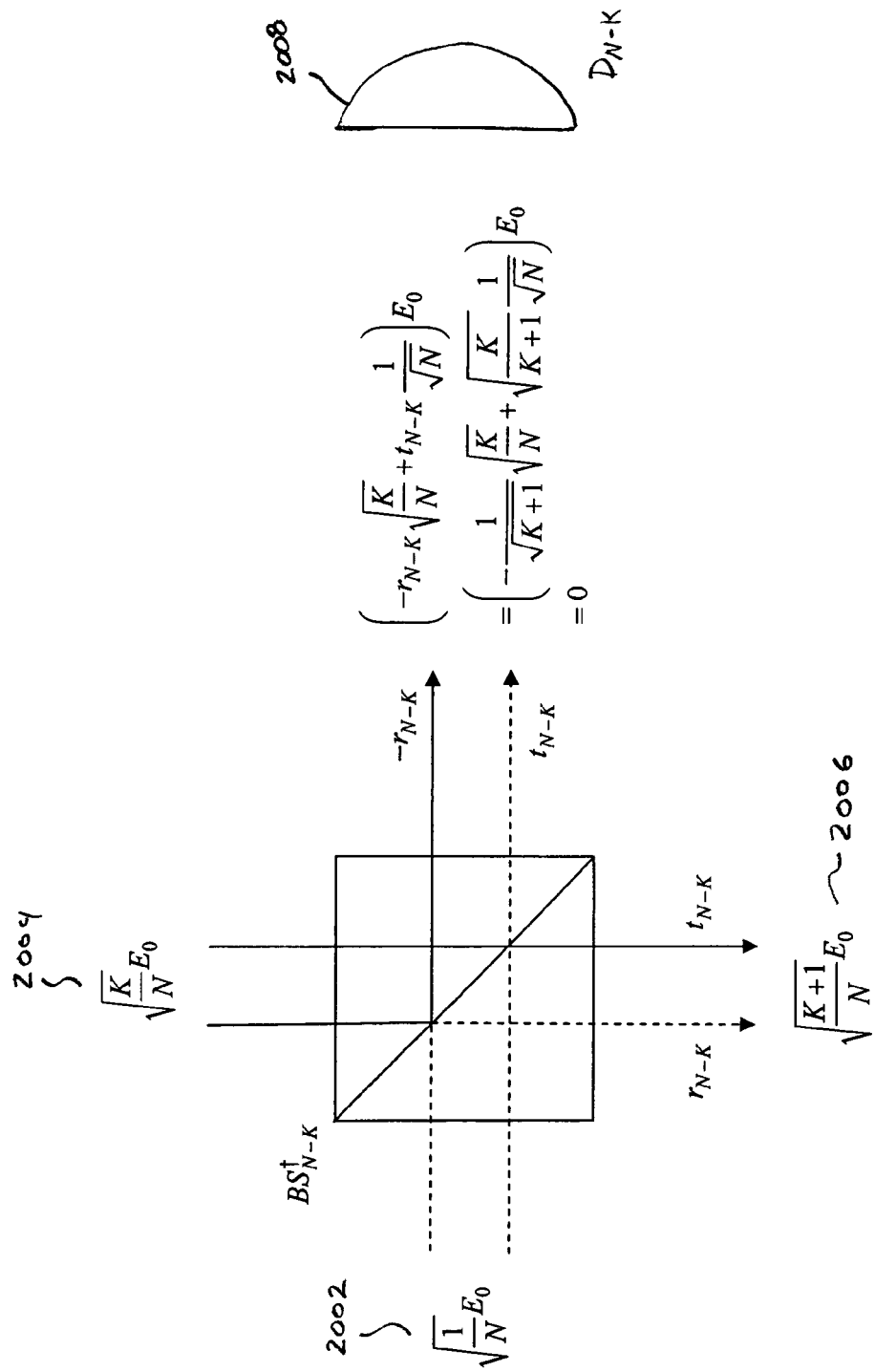
FIG. 20A shows a general formulation of electric field reflections and transmissions in beamsplitters of a demultiplexer that represents one of many embodiments of the present invention.

FIG. 20A shows a general formulation of electric field reflections and transmissions of the beamsplitters in the demultiplexer 1706 and represents one of many embodiments of the present invention. In FIG. 20A, the beamsplitter $BS_{N-K}^\dagger$ is input the electric field $E_0/\sqrt{N}$ 2002 that is output from a beamsplitter in the multiplexer 1704, as described above with reference to FIGS. 19A-19B. The beamsplitter is also input an electric field $\sqrt{K/N}E_0$ 2004 from an adjacent beamsplitter. Note that for K equal to "1," the beamsplitter $BS_{N-K}^\dagger$ is the beamsplitter 1720, in FIG. 17, and the electric field $\sqrt{K/N}E_0$ is output from the beamsplitter 1714, in FIG. 17. The beamsplitter $BS_{N-K}^\dagger$ outputs an electric field $\sqrt{(K+1)/N}E_0$ 2006. Note that for K equal to N−1, the electric field is transmitted to the detector 1730, otherwise the electric field is transmitted to an adjacent beamsplitter. The beamsplitter $BS_{N-K}^\dagger$ does not output any portion of the electric field $E_0$ to the detectors $D_{N-K}$ 2008.

Figure 20B:
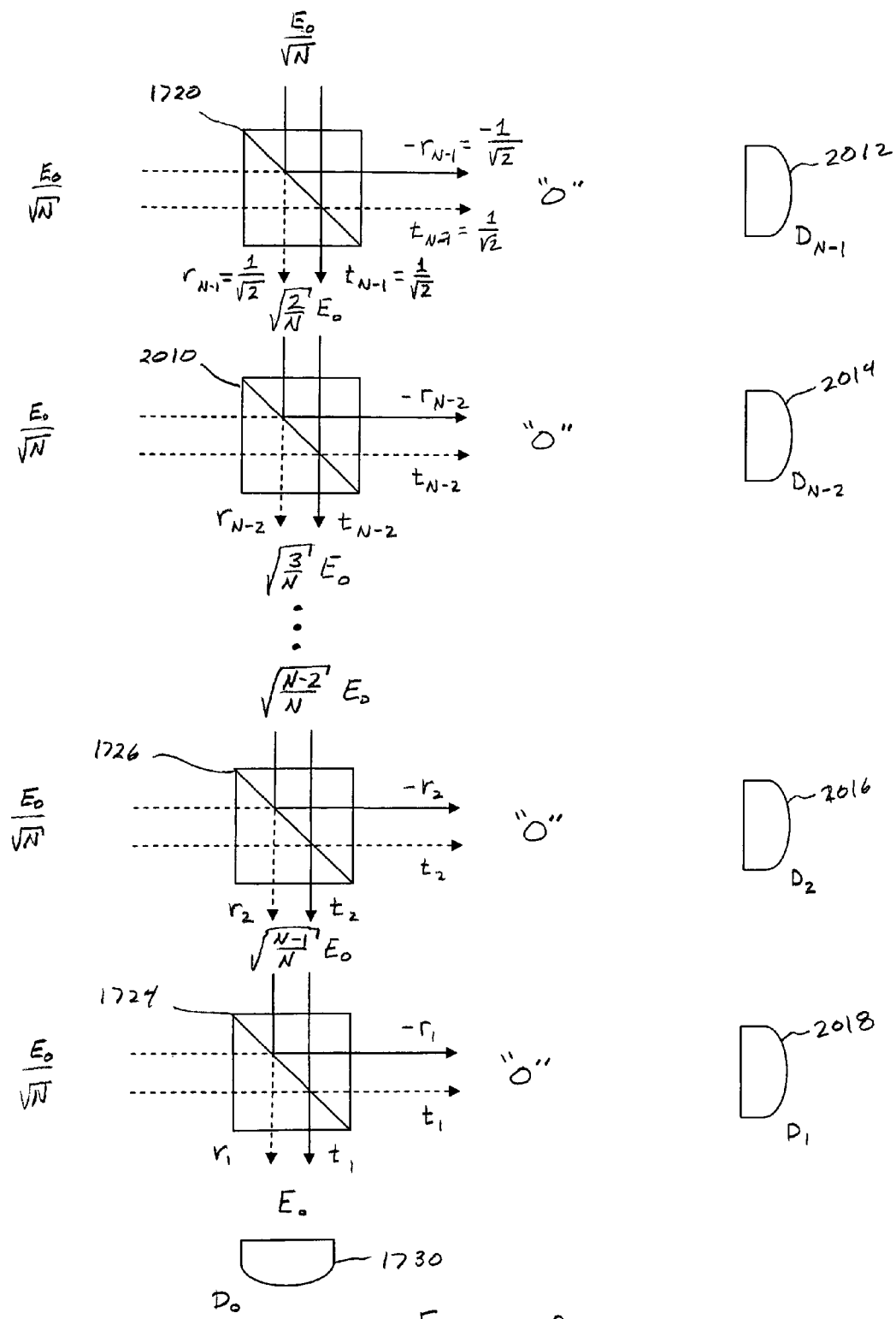
FIG. 20B shows electric field reflections and transmissions output from the beamsplitters in the demultiplexer, shown in FIG. 17, that represents one of many embodiments of the present invention.

FIG. 20B shows electric field reflections and transmissions output from the beamsplitters in the demultiplexer 1706 in accordance with the formulations provided in FIG. 20A that represents one of many embodiments of the present invention. For the beamsplitter $BS_{N-1}^\dagger$ 1720, the electric field $E_0/\sqrt{N}$ is input in both input channels, electric field $\sqrt{2/N}E_0$ is output to the adjacent beamsplitter 2010, and no portion of the electric field $E_0$ is output to the detector $D_{N-1}$ 2012. For the beamsplitter $BS_{N-2}^\dagger$ 2010, the electric field $E_0/\sqrt{N}$ is input from a transmission channel, the electric field $\sqrt{2/N}E_0$ is input from the adjacent beamsplitter $BS_{N-1}^\dagger$ 1720, the electric field $\sqrt{3/N}E_0$ is output to an adjacent beamsplitter (not shown), and no portion of the electric field $E_0$ is output to the detector $D_{N-2}$ 2014. For the beamsplitter $BS_2^\dagger$ 1726, the electric field $E_0/\sqrt{N}$ is input from a transmission channel, the electric field $\sqrt{N-2/N}E_0$ is input from an adjacent beamsplitter $BS_{N-1}^\dagger$ (not shown), the electric field $\sqrt{N-1/N}E_0$ is output to the beamsplitter $BS_1^\dagger$ 1724, and no portion of the electric field $E_0$ is output to the detector $D_2$ 2016. The beamsplitter $BS_1^\dagger$ 1724 (K equals N−1 in FIG. 20A) outputs the electric field $E_0$ to the detector $D_0$ 1730 and no electric field to detector $D_1$ 2018.

Figure 21:
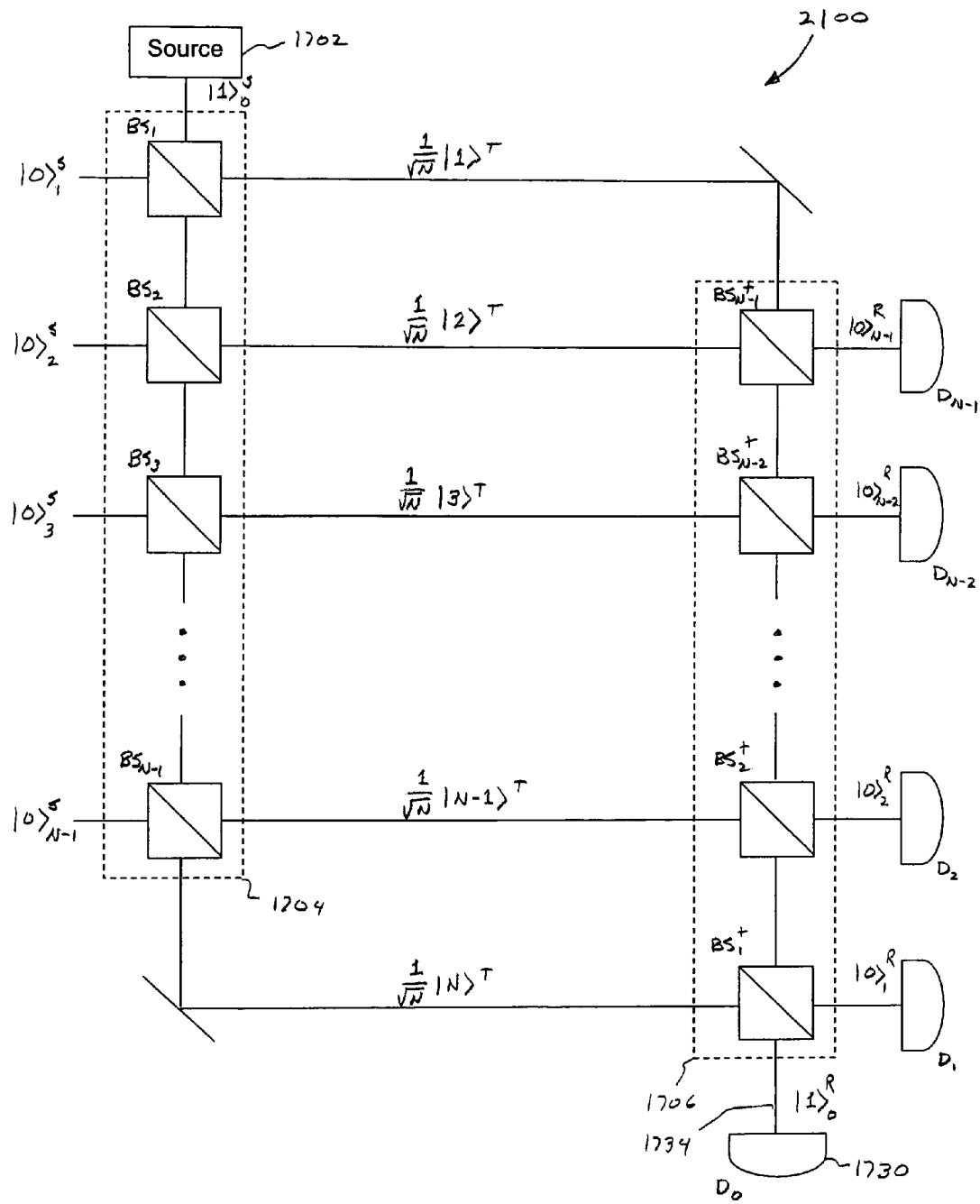
FIG. 21 illustrates a quantum signal-based application of the optical signal distribution system, shown in FIG. 17, that represents one of many embodiments of the present invention.

The reflection and transmission coefficients $r_n$ and $t_n$ can also be used for transmission of quantum signals in the distribution system 1700. FIG. 21 illustrates a quantum signal-based application of the distribution device, shown in FIG. 17 that represents one of many embodiments of the present invention. Transmitting a quantum signal in the distribution system 2100 is mathematically represented by:

$$|1\rangle_0^S|0\rangle_1^S\ldots|0\rangle_{N-1}^S \xrightarrow{MUX} \sum_{j=1}^{N} \frac{1}{\sqrt{N}}|j\rangle^T \xrightarrow{DEMUX} |1\rangle_0^R|0\rangle_1^R\ldots|0\rangle_{N-1}^R$$

The source state $|1\rangle_0^S$ represents a photon that is output by the source 1702 to the beamsplitter $BS_1$ 1714, and $|0\rangle_1^S - |0\rangle_{N-1}^S$ represent vacuum states that are input to the beamsplitters $BS_1$-$BS_{N-1}$, respectively. The intermediate summation $$\sum_{j=1}^{N} \frac{1}{\sqrt{N}}|j\rangle^T$$

is a coherent linear superposition of states that is transmitted in the N transmission channels, where $|j\rangle^T$ represents a tensor product $|0\rangle_1 \ldots |0\rangle_{j-1}|1\rangle_j|0\rangle_{j+1} \ldots |0\rangle_N$, and the subscripts corresponds to the transmission channels. The receiver state $|1\rangle_0^R$ represents the pulse output in the useful channel 1734 to the detector $D_0$ 1730, and $|0\rangle_1^R - |0\rangle_{N-1}^R$ represent vacuum states that are output to the detectors $D_1$-$D_{N-1}$. The detectors $D_0$-$D_{N-1}$ can be non-demolition detectors described in Hewlett Packard U.S. patent applications: "Photon number resolving system,"U.S. application Ser. No. 10/676,488, filed Sep. 30, 2003; "Detecting one or more photons from their interactions with probe photons in a matter system," U.S. application Ser. No. 10/678,437, filed Oct. 3, 2003; and "Non-demolition photon detector that preserves input state characteristics," U.S. application Ser. No. 10/836,012, filed Apr. 29, 2004.

When any one of the N transmission channels experiences a 100% loss, such as by cutting, or eavesdropping on, one of the transmission channels, the probability that the photon is output to a detector other than $D_0$ 1726 is given by:

$$\frac{2N-1}{N^2} \cong \frac{2}{N}$$

for N≫1. In other words, by multiplexing a signal over a large number of transmission channels the certainty associated with a transmission channel disruption is reduced from a probability of 1 to a probability of 2/N. When one of the transmission channels is cut, photon counts at the detectors $D_1$-$D_{N-1}$ increase, which can be used to alert transmission channel users that one or more of the transmission channels has been cut.

Figure 22:
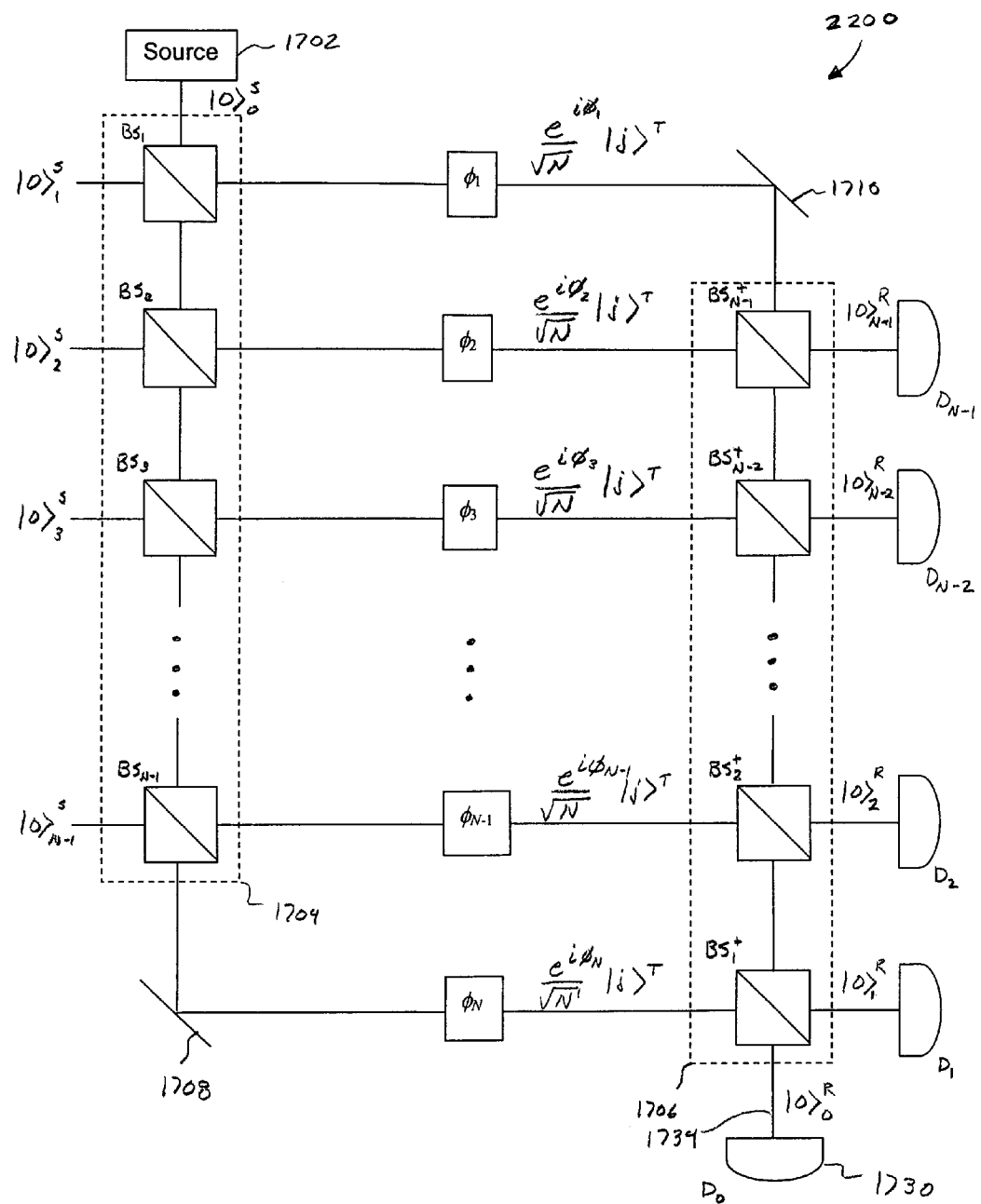
FIG. 22 illustrates an optical signal distribution system that includes phase shifts in transmission channels and represents one of many embodiments of the present invention.

In an alternate embodiment of the present invention, a phase shift can be introduced in each of the transmission channels. FIG. 22 illustrates a distribution system 2200 that includes phase shifts in the transmission channels and represents one of many embodiments of the present invention. Transmitting a quantum signal in the distribution system 2200 can be mathematically represented by:

$$|1\rangle_0^S|0\rangle_1^S \ldots |0\rangle_{N-1}^S \xrightarrow{MUX} \sum_{j=1}^{N} \frac{e^{i\phi_j}}{\sqrt{N}} |j\rangle^T \xrightarrow{DEMUX} |1\rangle_0^R|0\rangle_1^R \ldots |0\rangle_{N-1}^R$$

The phase shifts correspond to transmission channels of various lengths that can be lengthened or shortened in order to obtain the output state $|1\rangle_0^r|0\rangle_1^R \ldots |0\rangle_{N-1}^R$.

Figure 23A:
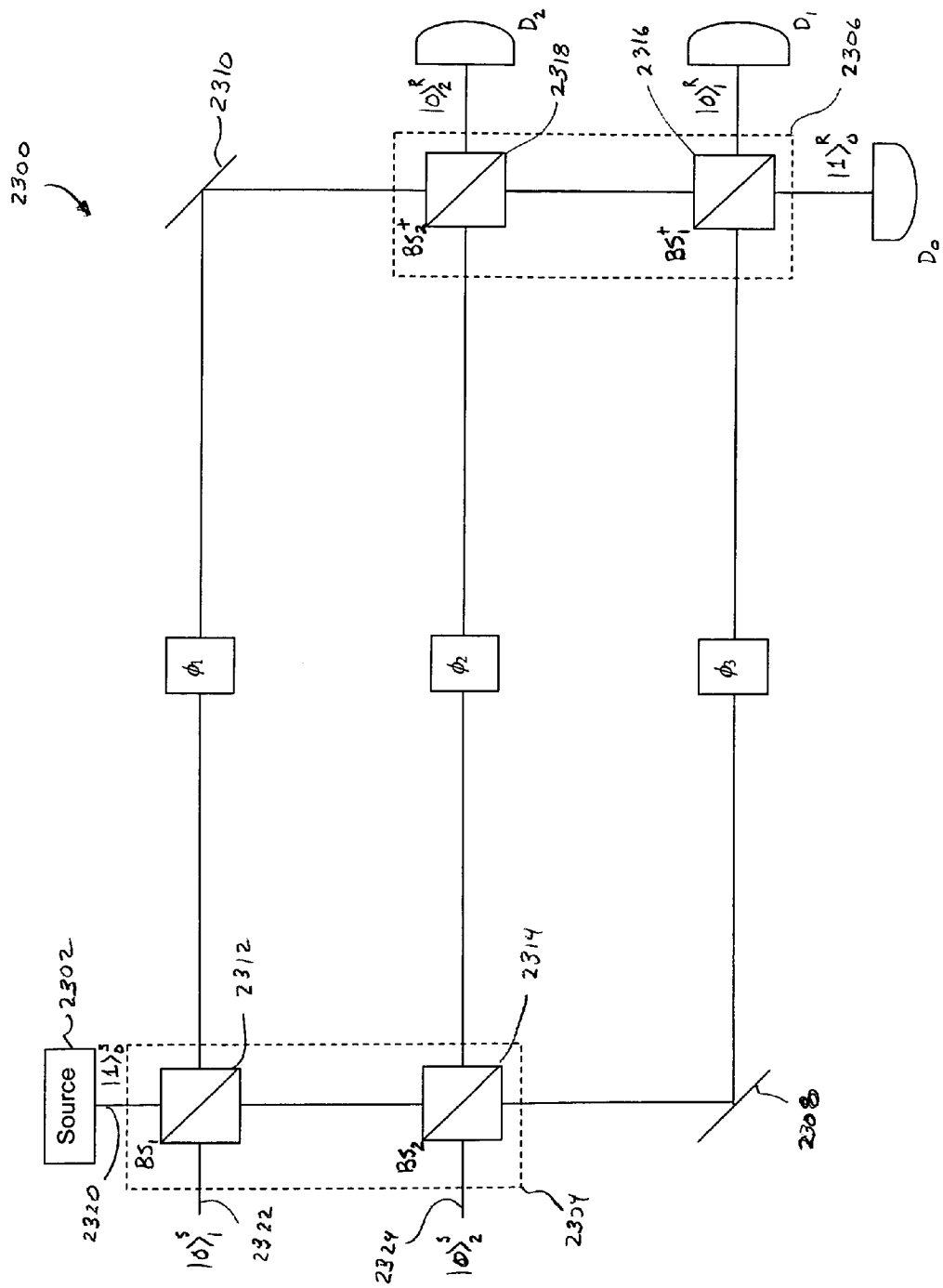
FIGS. 23A-23B illustrate an example optical signal distribution system that includes transmission channel phase shifts and represents one of many embodiments of the present invention.
Figure 23B:
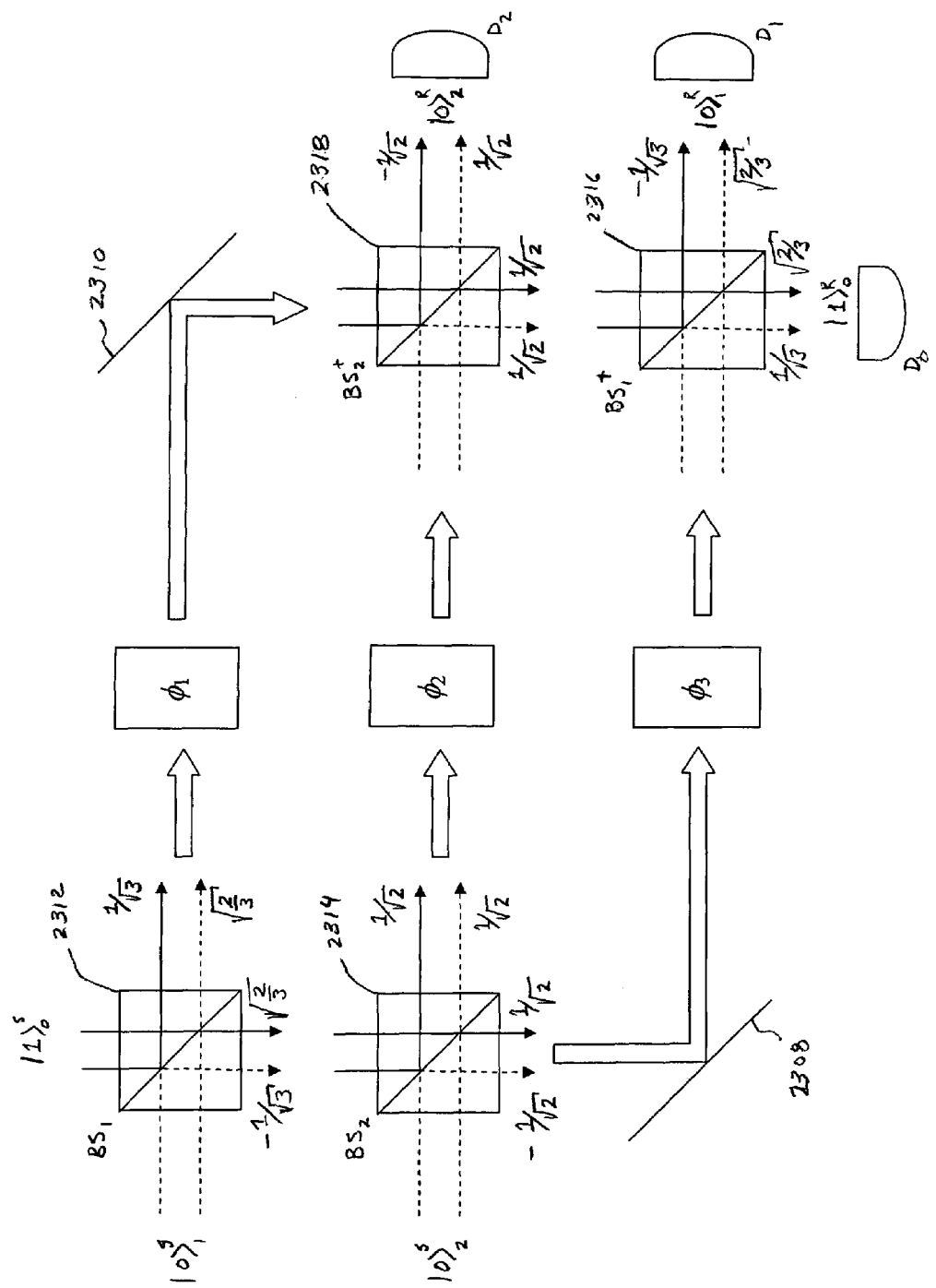

FIGS. 23A-23B illustrate an example optical signal distribution system 2300 that includes transmission channels with phase shifts and represents one of many embodiments of the present invention. In FIG. 23A, the distribution system 2300 includes a source 2302, a multiplexer 2304, a demultiplexer 2306, two mirrors 2308-2310, and three detectors $D_0$-$D_2$. The multiplexer 2304 is composed of beamsplitters $BS_1$ 2312 and $BS_2$ 2314, and the demultiplexer 2306 is composed of beamsplitters $BS_1^\dagger$ 2316 and $BS_2^\dagger$ 2318. The states $|1\rangle_0^S$, $|0\rangle_S$, and $|0\rangle_2^S$ are input to the multiplexer 2304 in source channels 2320, 2322, and 2324, respectively. FIG. 23B shows reflection and transmission coefficients associated with the beamsplitters in the multiplexer 2304 and the demultiplexer 2306, shown in FIG. 23A, that represents one of many embodiments of the present invention. The output of the multiplexer 2304 gives a coherent linear superposition of states represented by:

$$|\Psi\rangle_{in} = |1\rangle_0^S|0\rangle_1^S|0\rangle_2^S \xrightarrow{MUX}$$
$$\frac{1}{\sqrt{3}}|1\rangle_1^T|0\rangle_2^T|0\rangle_3^T + \frac{1}{\sqrt{3}}|0\rangle_1^T|1\rangle_2^T|0\rangle_3^T + \frac{1}{\sqrt{3}}|0\rangle_1^T|0\rangle_2^T|1\rangle_3^T$$

Because each transmission channel includes a phase shift, the coherent linear superposition of states becomes:

$$\frac{e^{i\phi_1}}{\sqrt{3}}|1\rangle_1^T|0\rangle_2^T|0\rangle_3^T + \frac{e^{i\phi_2}}{\sqrt{3}}|0\rangle_1^T|1\rangle_2^T|0\rangle_3^T + \frac{e^{i\phi_3}}{\sqrt{3}}|0\rangle_1^T|0\rangle_2^T|1\rangle_3^T$$

The demultiplexer 2306 receives the coherent linear superposition of states and outputs a coherent linear superposition of states given by:

$$|\Psi\rangle_{out} = \frac{e^{i\phi_1}+e^{i\phi_2}+e^{i\phi_3}}{3}|1\rangle_0^R|0\rangle_1^R|0\rangle_2^R +$$
$$\frac{-e^{i\phi_1}-e^{i\phi_2}+2e^{i\phi_3}}{3\sqrt{2}}|0\rangle_0^R|1\rangle_1^R|0\rangle_2^R + \frac{-e^{i\phi_1}+e^{i\phi_2}}{\sqrt{6}}|0\rangle_0^R|0\rangle_1^R|1\rangle_2^R$$

The probabilities associated with detecting the photon at the detectors $D_0$, $D_1$, or $D_2$ are given by:

$$P_{D_0} = \frac{3+2\cos(\phi_1-\phi_2)+2\cos(\phi_1-\phi_3)+2\cos(\phi_2-\phi_3)}{9},$$

$$P_{D_1} = \frac{3+\cos(\phi_1-\phi_2)-2\cos(\phi_1-\phi_3)-2\cos(\phi_2-\phi_3)}{9},$$

and $P_{D_2} = \frac{1-\cos(\phi_1-\phi_2)}{3}$

The lengths of the transmission channels can be adjusted so that the phase differences $\phi_1$-$\phi_2$, $\phi_1$-$\phi_3$, and $\phi_2$-$\phi_3$ are integer multiples of $2\pi$. As a result, the coefficients associated with the first and second terms of the output state $|\Psi\rangle_{out}$ are zero, and the output state $|\Psi\rangle_{out}$ reduces to:

$$|\Psi\rangle_{out} = |1\rangle_0^R|0\rangle_1^R|0\rangle_2^R$$

In other words, photons input to the distribution system 2300 are directed to the detector $D_0$ by tuning the phase differences $\phi_1$-$\phi_2$, $\phi_1$-$\phi_3$ and $\phi_2$-$\phi_3$. The probability of detecting the photon at the detector $D_0$ is 1, and the probability of detecting the photon at either detector $D_1$ or $D_2$ is 0.

Cutting or eavesdropping on one of the three transmission channels increases the probability of detecting photons at the detectors $D_1$ or $D_2$. Detecting photons at either of the detectors $D_1$ or $D_2$ can be used to alert transmission channel users that one or more of the transmission channels has been disturbed. For example, cutting the second transmission channel gives the following output state:

$$|\Psi\rangle_{out} = \frac{-1}{6}|0\rangle_0^R|0\rangle_1^R|1\rangle_2^R + \frac{1}{3\sqrt{2}}|0\rangle_0^R|1\rangle_1^R|0\rangle_2^R + \frac{2}{3}|1\rangle_0^R|0\rangle_1^R|0\rangle_2^R$$

The nonzero coefficients associated with the states $|0\rangle_0^R$-$0\rangle_1^R|1\rangle_2^R$ and $|0\rangle_0^R|1\rangle_1^R|0\rangle_2^R$ provide the probabilities of detecting the photon at either the detector $D_2$ or the detector $D_1$, respectively. The probability of detecting a photon at the detector $D_2$ is 1/6, the probability of detecting the photon at $D_1$ is 1/18, and the probability of detecting the photon at the detector $D_0$ has been reduce from 1 to 4/9. Overall, the probability of detecting the photon at any one of the three detectors is 2/3, and the probability of not detecting the photon at all is 1/3, as expected, because one of the transmission channels has been disrupted.

Figure 24:
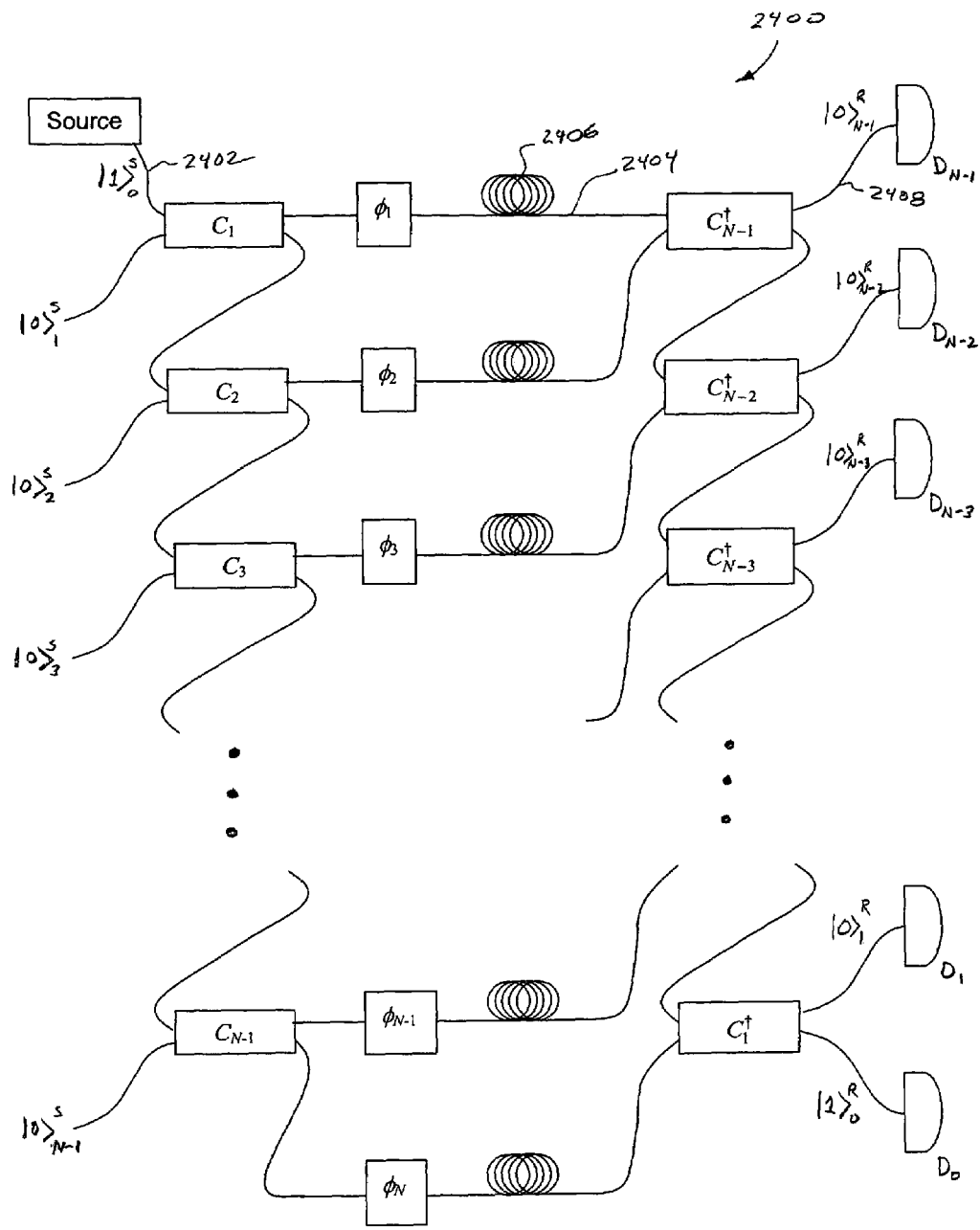
FIG. 24 illustrates an optical signal distribution system comprising couplers and optical fibers that represents one or many embodiments of the present invention.

Although the present invention has been described in terms of particular embodiments, it is not intended that the invention be limited to these embodiments. Modifications within the spirit of the invention will be apparent to those skilled in the art. For example, in an alternate embodiment of the present invention, the transmission channels and beamsplitters described above with reference to FIGS. 17, 21, 22, and 23A can be replaced with optical fibers and couplers. FIG. 24 illustrates a distribution system 2400 composed couplers and optical fibers that represents one or many embodiments of the present invention. The distribution system 2400 includes source optical fibers, such as source optical fiber 2402, that transmit the input state $|1\rangle_0^S|0\rangle_1^S \ldots |0\rangle_{N-1}^S$ to a multiplexer composed of couplers denoted by $C_1$-$C_{N-1}$. The couplers transmit a superposition of states over optical fibers, such as optical fiber 2404, to a demultiplexer composed of couplers denoted by $C_1^\dagger$-$C_{N-1}^\dagger$. The optical fibers can have various lengths that range from less than an centimeter to thousands of kilometers or longer, as represented by coils, such as coil 2406. The couplers $C_1^\dagger$-$C_{N-1}^\dagger$ transmit the output state $|1\rangle_0^R |0\rangle^R \ldots |0\rangle_{N-1}^R$ to the detectors $D_1$-$D_{N-1}$ in receiver optical fibers, such a receiver optical fiber 2408. The couplers in the multiplexer and the demultiplexer can be 3 dB couplers that operate as the beamsplitters described above with references to FIGS. 19A-20B. In alternated embodiments of the present invention, the couplers in the distribution system 2400 can be replaced with beamsplitters or with different combinations of beamsplitters and couplers. In an alternate embodiment of the present invention, the beamsplitters in the multiplexers and the demultiplexers can be replaced with polarizing beamsplitters.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A signal distribution system for circumventing and altering transmission channel users of transmission-channel disruptions, the signal distribution system comprising:
    a source that encodes information in an optical signal and transmits the optical signal in a source channel;
    a multiplexer configured to receive the optical signal from the source channel and distribute the optical signal over N transmission channels, each optical signal carrying the same information as the first signal;
    a demultiplexer configured to receive the optical signals carried over the N transmission channels; and
    N detectors, wherein the demultiplexer is configured so that only one of the N detectors receives one of the optical signals when none of the N transmission channels are disrupted, and when one or more of the transmission channels are disrupted two or more of the N detectors receive two or more of optical signals completing the transmission and alerting transmission-channel users of the disruption to the one or more transmission channels.

2. The distribution system of claim 1 wherein the multiplexer further comprises N−1 beamsplitters, each beamsplitter mathematically represented by:

$$U_{BS_n} = \begin{bmatrix} t_n & r_n \\ -r_n & t_n \end{bmatrix}$$

where n is a beamsplitter index, and $$r_n = \frac{1}{\sqrt{N-n+1}}, \text{ and}$$

$$t_n = \sqrt{\frac{N-n}{N-n+1}}.$$

3. The distribution system of claim 1 wherein the demultiplexer further comprises N−1 beamsplitters, each beamsplitter mathematically represented by:

$$U_{BS_n}^+ = \begin{bmatrix} t_n & -r_n \\ r_n & t_n \end{bmatrix}$$

where n is a beamsplitter index, and $$r_n = \frac{1}{\sqrt{N-n+1}}, \text{ and}$$

$$t_n = \sqrt{\frac{N-n}{N-n+1}}.$$

4. The distribution system of claim 1 wherein the optical signal further comprises an optical qubit distributed over the N transmission channels as a coherent linear superposition of states.

5. The distribution system of claim 1 wherein the transmission channels are optical fibers.

6. The distribution system of claim 1 wherein the distributed optical signal further comprises an optical signal comprising a coherent linear superposition of states.

7. The distribution system of claim 1 wherein the detectors are non-demolition detectors.

8. A system for circumventing a transmission-channel disruption and alerting transmission-channel users of the transmission-channel disruption, the system comprising:
    an input for receiving an optical signal encoding information;
    N−1 multiplexing beamsplitters configured and oriented to split the optical signal into N distributed optical signals, each of the N distributed optical signals carrying the same information as the signal;
    N transmission channels, each transmission channel configured to carry one of the N distributed optical signals;
    N−1 demultiplexing beamsplitters configured to receive the N distributed optical signals; and
    N detectors, wherein the N−1 demultiplexing beamsplitters are configured and oriented so that only one of the N detectors receives one of the distributed optical signals when none of the N transmission channels are disrupted, and when one or more of the N transmission channels are disrupted two or more of the N detectors receive two to more of the N distributed optical signals completing the transmission and alerting transmission-channel users of the disruption to the N transmission channels.

9. The system of claim 8 wherein the optical signal further comprises electromagnetic waves encoding information in one of:
    amplitude of the electromagnetic wave;
    phase of the electromagnetic wave; and
    frequency of the electromagnetic wave.

10. The system of claim 8 wherein the optical signal further comprises one or more qubits.

11. The system of claim 8 wherein the N−1 multiplexing beamsplitters are mathematically represented by:

$$U_{BS_n} = \begin{bmatrix} t_n & r_n \\ -r_n & t_n \end{bmatrix}$$

where n is a beamsplitter index, and $$r_n = \frac{1}{\sqrt{N-n+1}}, \text{ and}$$

$$t_n = \sqrt{\frac{N-n}{N-n+1}}.$$

12. The system of claim 8 wherein the N−1 demultiplexing beamsplitters are mathematically represented by:

$$U_{BS_n}^{+} = \begin{bmatrix} t_n & -r_n \\ r_n & t_n \end{bmatrix}$$

where n is a beamsplitter index, and $$r_n = \frac{1}{\sqrt{N-n+1}}, \text{ and}$$

$$t_n = \sqrt{\frac{N-n}{N-n+1}}.$$

13. A method for alerting transmission-channel users of a disruption in one or more transmission channels, the method comprising:
  producing an optical signal that encodes information;
  multiplexing the optical signal by distributing the optical signal over N transmission channels to obtain N distributed signals, each of the N distributed optical signals encoding the information;
  demultiplexing the N distributed signals by combining the N distributed optical signals into a second optical signal that encodes the information;
  detecting the second optical signal at a first detector when none of the N transmission channels are disrupted; and
  detecting a third optical signal encoding the information at a second detector when a disruption occurs in one or more of the N transmission channels, the third optical signal alerts the transmission-channel users of the disruption.

14. The method of claim 13 wherein producing the optical signal further comprises encoding information in an electromagnetic wave by one of:
  modulating the amplitude of the electromagnetic wave;
  modulating the phase of the electromagnetic wave; and
  modulating the frequency of the electromagnetic wave.

15. The method of claim 13 wherein producing the optical signal further comprises encoding information in one or more qubits.

16. The method of claim 13 wherein multiplexing the optical signal further comprises transmitting the optical signal to a multiplexer comprising N−1 beamsplitters mathematically represented by:

$$U_{BS_n} = \begin{bmatrix} t_n & r_n \\ -r_n & t_n \end{bmatrix}$$

where n is a beamsplitter index, and $$r_n = \frac{1}{\sqrt{N-n+1}}, \text{ and}$$

$$t_n = \sqrt{\frac{N-n}{N-n+1}}.$$

17. The method of claim 13 wherein demultiplexing the distributed optical signals further comprises transmitting the optical signals distributed in N transmission channels to a demultiplexer comprising N−1 beamsplitters mathematically represented by:

$$U_{BS_n}^{+} = \begin{bmatrix} t_n & -r_n \\ r_n & t_n \end{bmatrix}$$

where n is a beamsplitter index, and $$r_n = \frac{1}{\sqrt{N-n+1}}, \text{ and}$$

$$t_n = \sqrt{\frac{N-n}{N-n+1}}.$$

\* \* \* \* \*